(12) United States Patent
Zhao et al.

(10) Patent No.: US 12,149,722 B2
(45) Date of Patent: *Nov. 19, 2024

(54) PDPC UNIFICATION

(71) Applicant: Tencent America LLC, Palo Alto, CA (US)

(72) Inventors: Liang Zhao, Sunnyvale, CA (US); Xin Zhao, Santa Clara, CA (US); Xiang Li, Saratoga, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 17/981,165

(22) Filed: Nov. 4, 2022

(65) Prior Publication Data

US 2023/0199207 A1    Jun. 22, 2023

Related U.S. Application Data

(63) Continuation of application No. 17/243,009, filed on Apr. 28, 2021, now Pat. No. 11,575,923, which is a
(Continued)

(51) Int. Cl.
*H04N 19/44* (2014.01)
*H04N 19/105* (2014.01)
(Continued)

(52) U.S. Cl.
CPC .......... *H04N 19/44* (2014.11); *H04N 19/105* (2014.11); *H04N 19/159* (2014.11); *H04N 19/176* (2014.11)

(58) Field of Classification Search
None
See application file for complete search history.

(56) References Cited

U.S. PATENT DOCUMENTS

| 10,284,844 | B1 | 5/2019 | Zhao et al. |
| 2017/0094285 | A1 | 3/2017 | Said et al. |

(Continued)

FOREIGN PATENT DOCUMENTS

| WO | 2015100726 A1 | 7/2015 |
| WO | 2017165509 A1 | 9/2017 |

OTHER PUBLICATIONS

Singaporean Search Report and Written Opinion issued Feb. 23, 2023 in Application No. 11202110392T, p. 1-8.
(Continued)

*Primary Examiner* — Christopher Braniff
(74) *Attorney, Agent, or Firm* — ArentFox Schiff LLP

(57) ABSTRACT

Aspects of the disclosure provide methods and apparatuses for video encoding/decoding. An apparatus for video decoding includes processing circuitry that decodes prediction information for a current block in a current picture that is included in a coded video sequence. The prediction information indicates an intra prediction mode of the current block. The processing circuitry determines a position dependent prediction combination (PDPC) process according to the intra prediction mode of the current block indicated by the prediction information. Further, the processing circuitry reconstructs the current block based on the determined PDPC process. A same PDPC process is applied to intra prediction modes adjacent to diagonal intra prediction modes.

20 Claims, 14 Drawing Sheets

Related U.S. Application Data continuation of application No. 15/931,225, filed on May 13, 2020, now Pat. No. 11,039,156.

(60) Provisional application No. 62/869,015, filed on Jun. 30, 2019, provisional application No. 62/859,920, filed on Jun. 11, 2019.

(51) Int. Cl.
*H04N 19/159* (2014.01)
*H04N 19/176* (2014.01)

(56) References Cited

U.S. PATENT DOCUMENTS

| | | | |
|---|---|---|---|
| 2018/0176587 A1 | 6/2018 | Panusopone et al. | |
| 2020/0021817 A1* | 1/2020 | Van der Auwera | H04N 19/167 |
| 2020/0195921 A1 | 6/2020 | Van Der Auwera et al. | |

OTHER PUBLICATIONS

Bross et al., "Versatile Video Coding (Draft 5)," JVET-N1001, 14th Meeting: Geneva, CH, Mar. 19-27, 2019 (385 pages).

Supplementary European Search Report issued Mar. 27, 2023 in Application No. 20822885.8, p. 1-1.

Van Der Auwera G et al: "Non-CE3: PDPC extension", 13. JVET Meeting; Jan. 9, 2019-Jan. 18, 2019; Marrakech; (The Joint Video Exploration Team of ISO/IEC JTC1/SC29/WG11 and ITU-T SG.16), No. JVET-M0478, Jan. 11, 2019, pp. 1-3.

Jianle Chen et al: "Algorithm description for Versatile Video Coding and Test Model 5 (VTM 5) ", 14. JVET Meeting; Mar. 19, 2019-Mar. 27, 2019; Geneva; (The Joint Video Exploration Team of ISO/IEC JTC1/SC29/WG11 and ITU-T SG.16 ) , No. JVET-N1002-v1; May 21, 2019, pp. 1-70.

Drugeon V: "CE3-related: disabling PDPC based on availability of reference samples", 13. JVET Meeting; Jan. 9, 2019-Jan. 18, 2019; Marrakech; (The Joint Video Exploration Team of ISO/IEC JTC1/SC29/WG11 and ITU-T SG.16 ), No. JVET-M0358, Jan. 15, 2019, pp. 1-11.

Sarwer M G et al: "CE3-related: Boundary PDPC", 12. JVET Meeting; Oct. 3, 2018-Oct. 12, 2018; Macao; (The Joint Video Exploration Team of ISO/IEC JTC1/SC29/WG11 and ITU-T SG.16), No. JVET-L0087, Oct. 4, 2018, pp. 1-4.

International Search Report and Written Opinion in PCT/US2020/035519, mailed Aug. 7, 2020, 16 pages.

Said et al. "Position dependent predicition combination for intra-frame video coding," IEEE International Conference on Image Processing (ICIP), Sep. 25-28, 2016, pp. 534-538.

* cited by examiner

| predModeIntra | intraPredAngle | predModeIntra | intraPredAngle | predModeIntra | intraPredAngle | predModeIntra | intraPredAngle | predModeIntra | intraPredAngle | predModeIntra | intraPredAngle |
|---|---|---|---|---|---|---|---|---|---|---|---|
| 4 | 26 | 21 | −3 | 38 | −20 | 55 | 6 | 72 | 64 |  |  |
| 3 | 29 | 20 | −2 | 37 | −23 | 54 | 4 | 71 | 57 |  |  |
| 2 | 32 | 19 | −1 | 36 | −26 | 53 | 3 | 70 | 51 |  |  |
| −1 | 35 | 18 | 0 | 35 | −29 | 52 | 2 | 69 | 45 |  |  |
| −2 | 39 | 17 | 1 | 34 | −32 | 51 | 1 | 68 | 39 |  |  |
| −3 | 45 | 16 | 2 | 33 | −29 | 50 | 0 | 67 | 35 |  |  |
| −4 | 51 | 15 | 3 | 32 | −26 | 49 | −1 | 66 | 32 |  |  |
| −5 | 57 | 14 | 4 | 31 | −23 | 48 | −2 | 65 | 29 |  |  |
| −6 | 64 | 13 | 6 | 30 | −20 | 47 | −3 | 64 | 26 |  |  |
| −7 | 73 | 12 | 8 | 29 | −18 | 46 | −4 | 63 | 23 | 80 | 512 |
| −8 | 86 | 11 | 10 | 28 | −16 | 45 | −6 | 62 | 20 | 79 | 341 |
| −9 | 102 | 10 | 12 | 27 | −14 | 44 | −8 | 61 | 18 | 78 | 256 |
| −10 | 128 | 9 | 14 | 26 | −12 | 43 | −10 | 60 | 16 | 77 | 171 |
| −11 | 171 | 8 | 16 | 25 | −10 | 42 | −12 | 59 | 14 | 76 | 128 |
| −12 | 256 | 7 | 18 | 24 | −8 | 41 | −14 | 58 | 12 | 75 | 102 |
| −13 | 341 | 6 | 20 | 23 | −6 | 40 | −16 | 57 | 10 | 74 | 86 |
| −14 | 512 | 5 | 23 | 22 | −4 | 39 | −18 | 56 | 8 | 73 | 73 |

*FIG. 8B*

PDPC UNIFICATION

INCORPORATION BY REFERENCE

This application is a continuation of U.S. application Ser. No. 17/243,009, filed on Apr. 28, 2021, which claims the benefit of priority to U.S. application Ser. No. 15/931,225, now U.S. Pat. No. 11,039,156, filed on May 13, 2020, U.S. Provisional Application No. 62/859,920, "UNIFIED POSITION DEPENDENT PREDICTION COMBINATION PROCESS" filed on Jun. 11, 2019, and U.S. Provisional Application No. 62/869,015, "FURTHER UNIFICATION ON POSITION DEPENDENT PREDICTION COMBINATION PROCESS" filed on Jun. 30, 2019. The disclosures of the prior applications are hereby incorporated by reference in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate) of, for example, 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may be predicted itself.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (105) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of a neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described herein is a technique henceforth referred to as "spatial merge."

Referring to FIG. 1C, a current block (111) can include samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (112 through 116, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes processing circuitry.

According to aspects of the disclosure, there is provided a method for video decoding in a decoder. In the method, the processing circuitry decodes prediction information for a current block in a current picture that is a part of a coded video sequence. The prediction information indicates an intra prediction direction for the current block that is one of (i) a diagonal intra prediction direction or (ii) a neighboring intra prediction direction adjacent to the diagonal intra prediction direction. The processing circuitry determines a usage of a position dependent prediction combination (PDPC) process according to the intra prediction direction of the current block. The same PDPC process is applied to both the diagonal intra prediction direction and the neighboring intra prediction direction. The processing circuitry reconstructs the current block based on the usage of the PDPC process on the current block.

According to aspects of the disclosure, the diagonal intra prediction direction is one of a bottom-left intra prediction direction and a top-right intra prediction direction. In an embodiment, when the diagonal intra prediction direction is the bottom-left intra prediction direction, a mode index of the neighboring intra prediction direction is below a mode index of a horizontal intra prediction direction. In an embodiment, when the diagonal intra prediction direction is the top-right intra prediction direction, the mode index of the neighboring intra prediction direction is above a mode index of a vertical intra prediction direction.

According to aspects of the disclosure, when the intra prediction direction is the neighboring intra prediction direction, the processing circuitry determines whether the intra prediction direction points to a fractional position. In response to a determination that the intra prediction points to the fractional position, the processing circuitry determines an early termination of the PDPC process.

According to aspects of the disclosure, when a current sample in the current block is to be filtered by the PDPC process, the processing circuitry determines whether a reference sample of the current sample is located within a preset range according to a per-row or per-column checking. In an embodiment, the per-column checking depends on at least one of (i) a total number of available reference samples that are located left to the current block, (ii) a block height of the current block, and (iii) a horizontal coordinate value of the current sample. In an embodiment, the per-row checking depends on at least one of (i) a total number of available reference samples that are located above the current block, (ii) a block width of the current block, (iii) and a vertical coordinate value of the current sample.

According to aspects of the disclosure, an angle of the intra prediction direction is equal to or greater than a preset value. In an embodiment, when the intra prediction direction is closer to the vertical intra prediction direction than the horizontal intra prediction direction, the processing circuitry performs the PDPC process on a first number of columns of samples in the current block, and the first number is determined according to the preset value and a block size of the current block. In an embodiment, when the intra prediction direction is closer to the horizontal intra prediction direction than the vertical intra prediction direction, the processing circuitry performs the PDPC process on a second number of rows of samples in the current block, and the second number is determined according to the preset value and the block size of the current block.

Aspects of the disclosure also provide a non-transitory computer-readable medium storing instructions which when executed by a computer for video decoding cause the computer to perform any one or a combination of the methods for video decoding.

BRIEF DESCRIPTION OF THE DRAWINGS

Further features, the nature, and various advantages of the disclosed subject matter will be more apparent from the following detailed description and the accompanying drawings in which:

FIG. 8B shows a table of angular intra prediction modes and their corresponding intra prediction angles in some examples (e.g., VVC);

DETAILED DESCRIPTION OF EMBODIMENTS

Video Encoder and Decoder

Figure 1A:
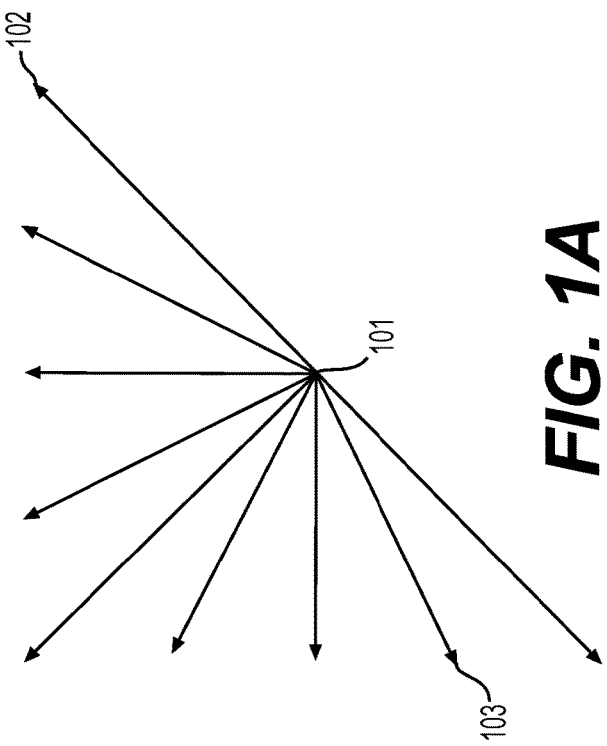
FIG. 1A is a schematic illustration of an exemplary subset of intra prediction modes.
Figure 1B:
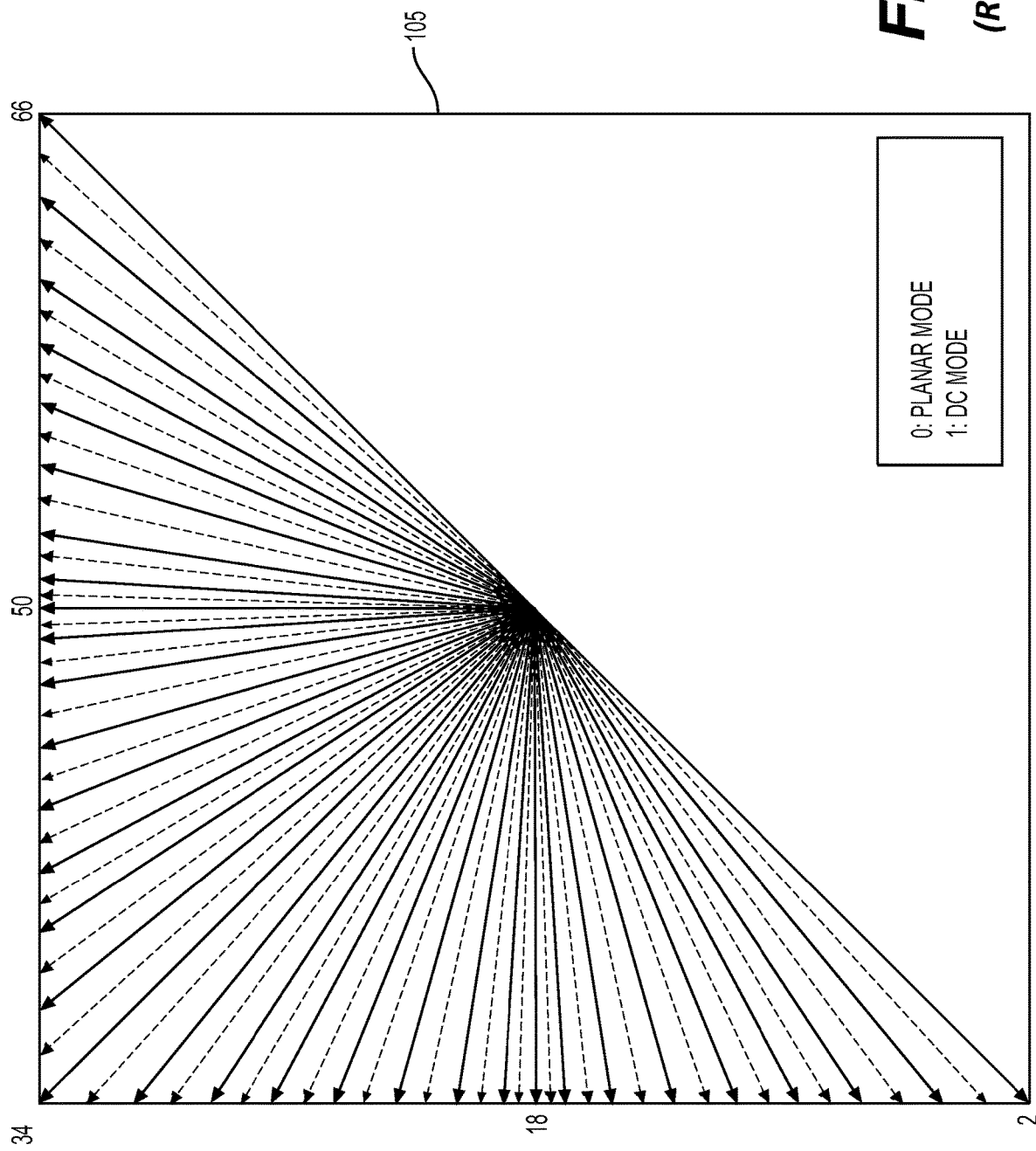
FIG. 1B is an illustration of exemplary intra prediction directions.
Figure 1C:
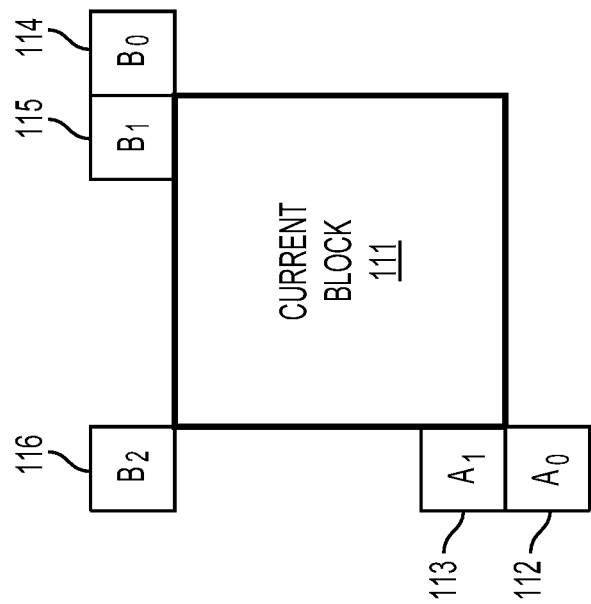
FIG. 1C is a schematic illustration of a current block and its surrounding spatial merge candidates in one example.
Figure 2:
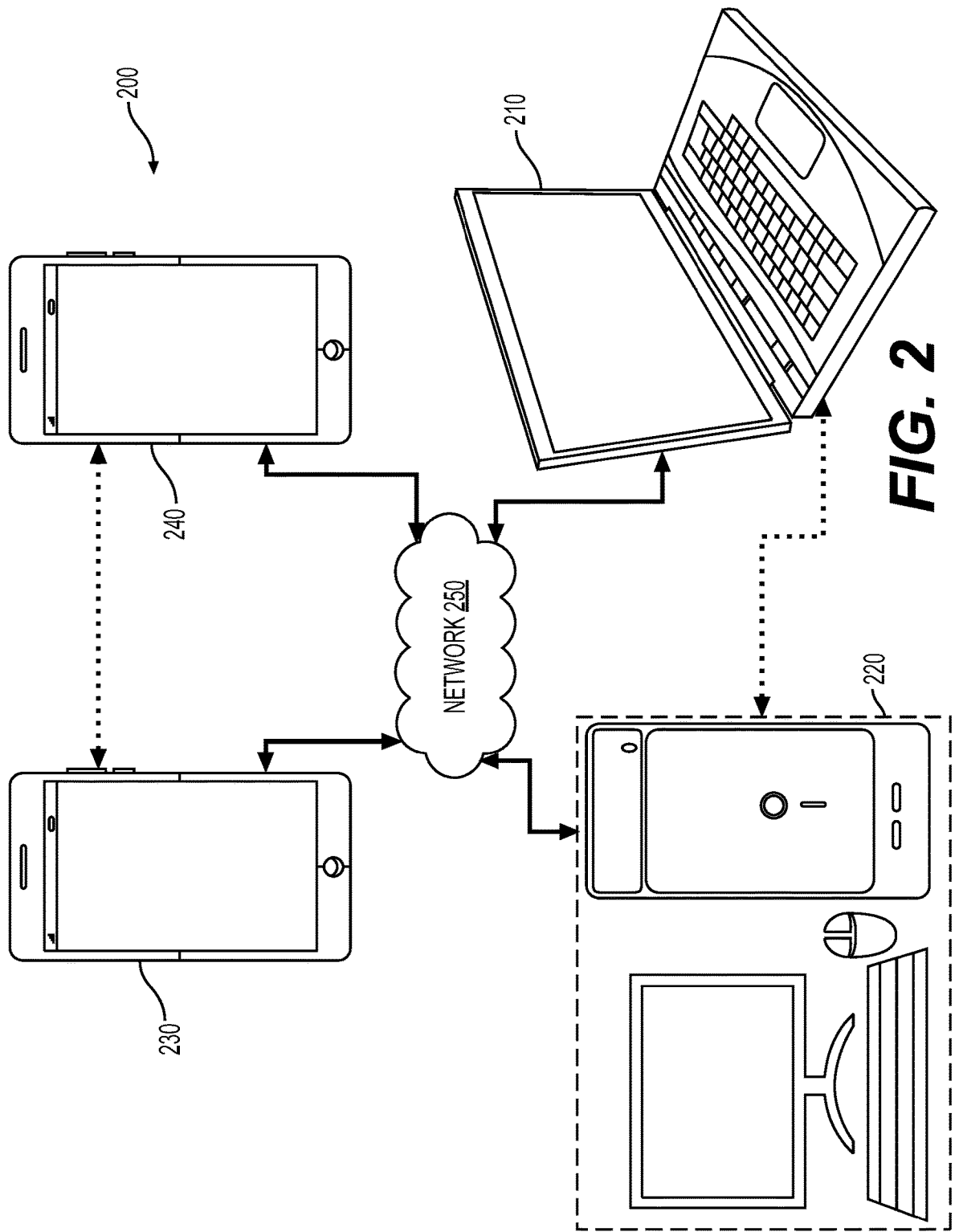
FIG. 2 is a schematic illustration of a simplified block diagram of a communication system in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
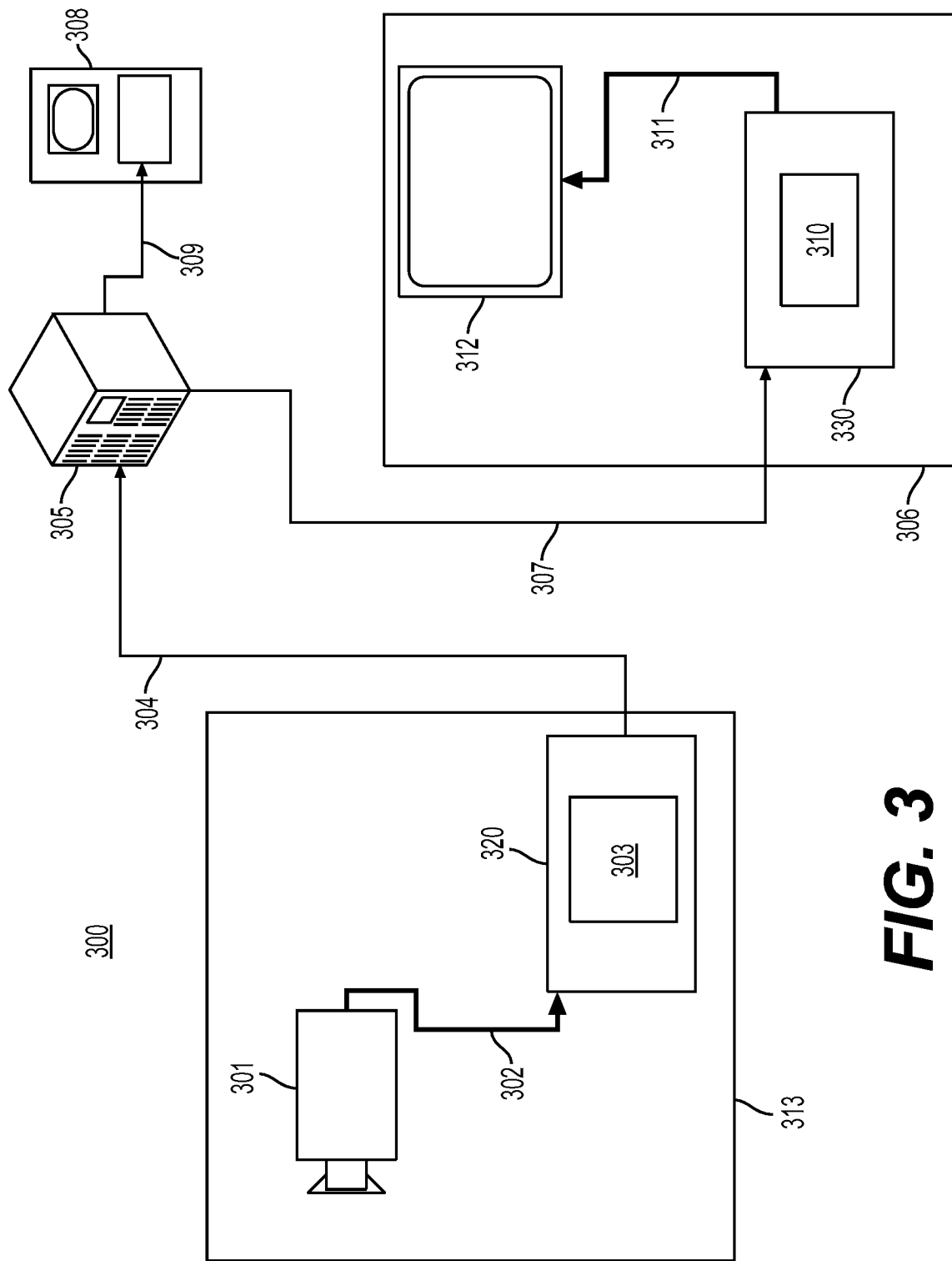
FIG. 3 is a schematic illustration of a simplified block diagram of a communication system in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick, and the like.

A streaming system may include a capture subsystem (313) that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
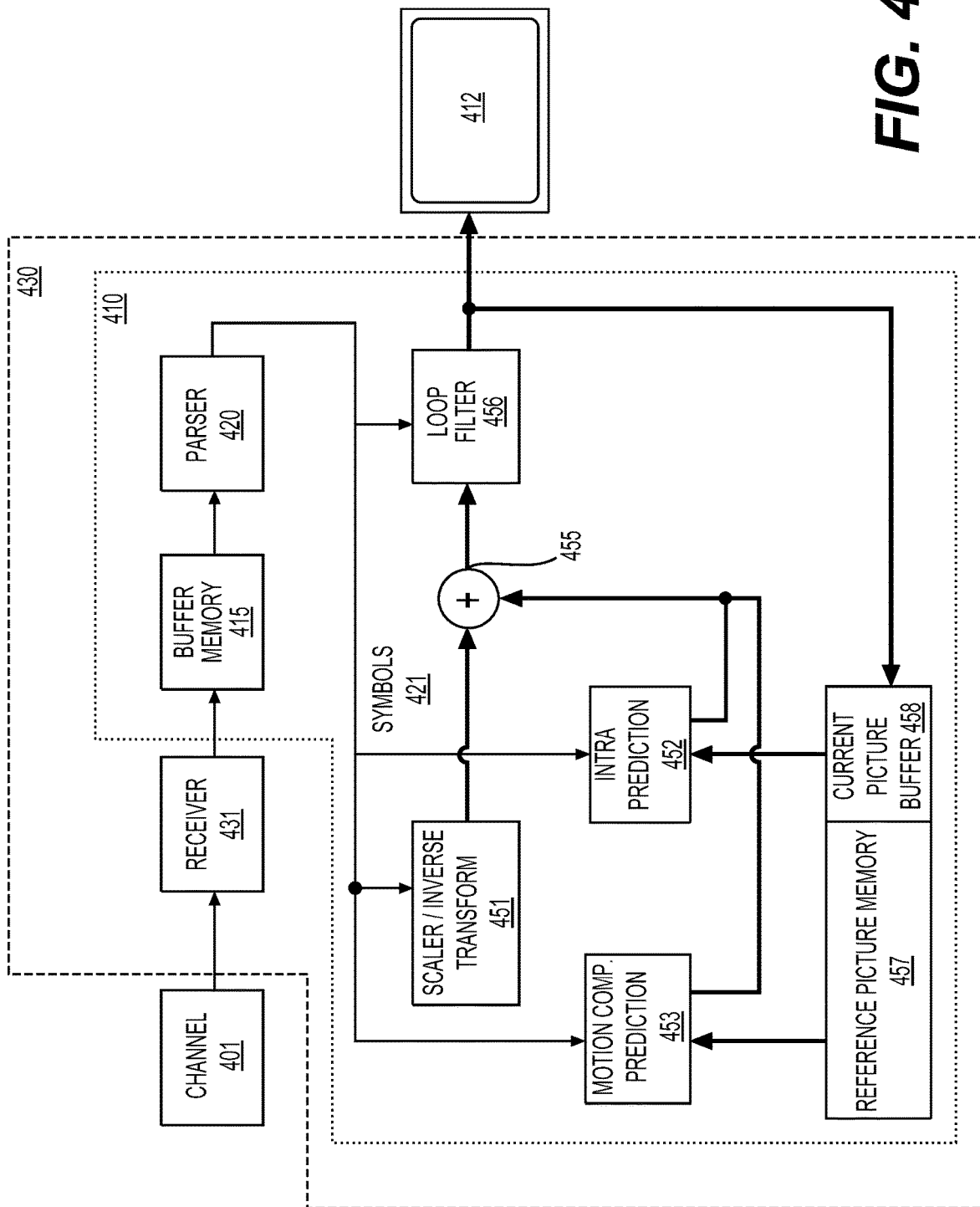
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information that the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
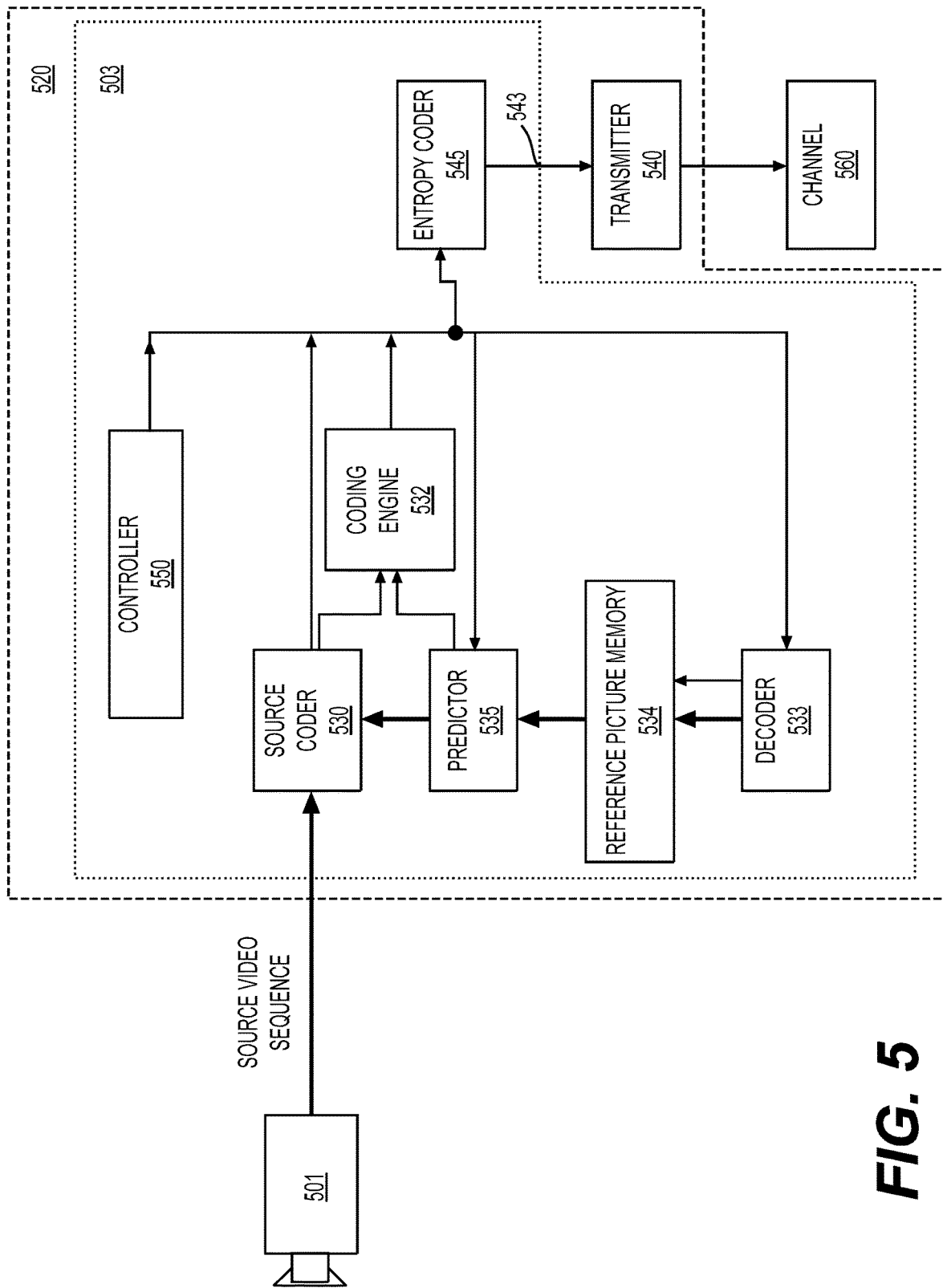
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector allowed reference area, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415) and the parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quad-tree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
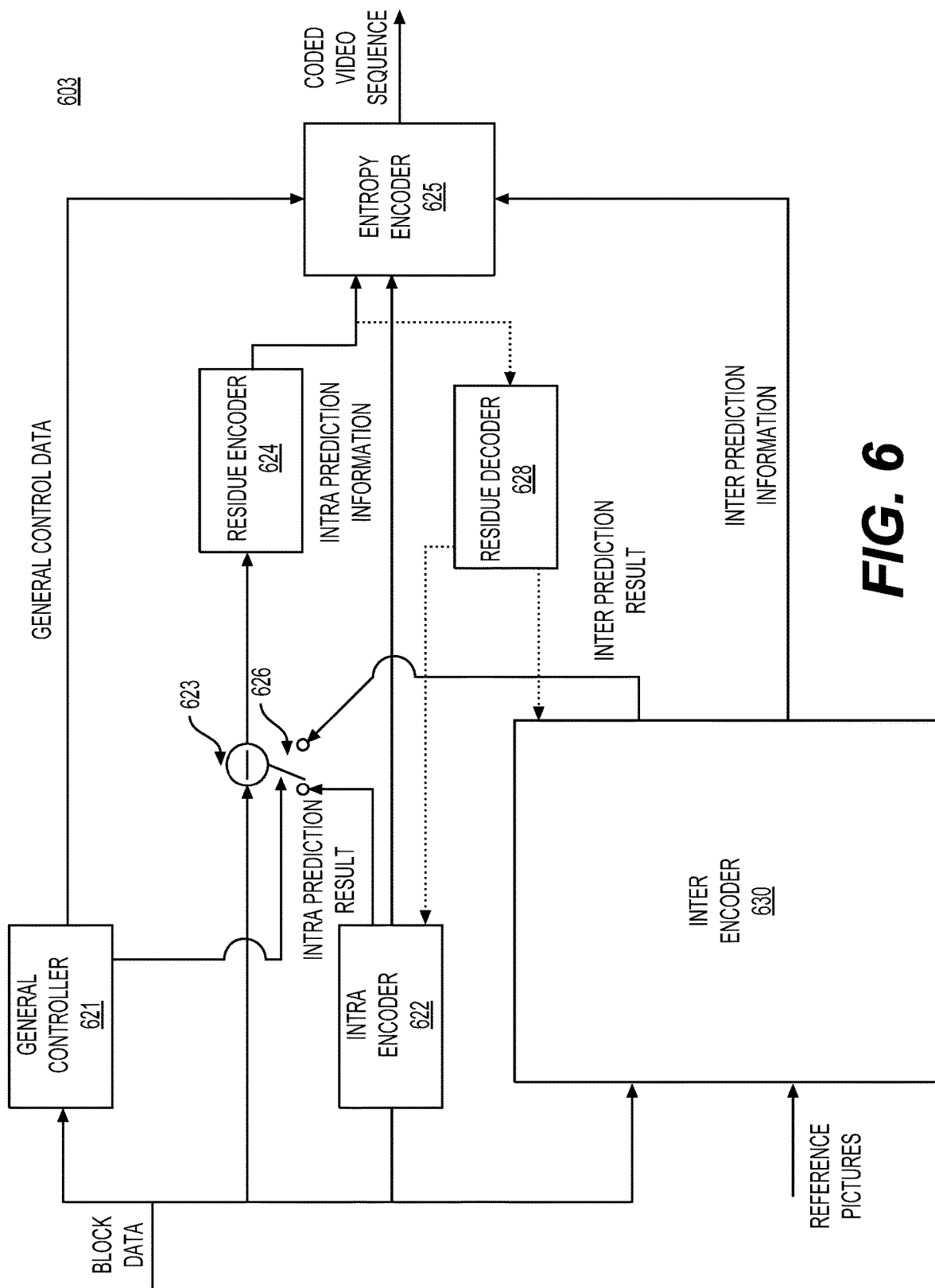
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
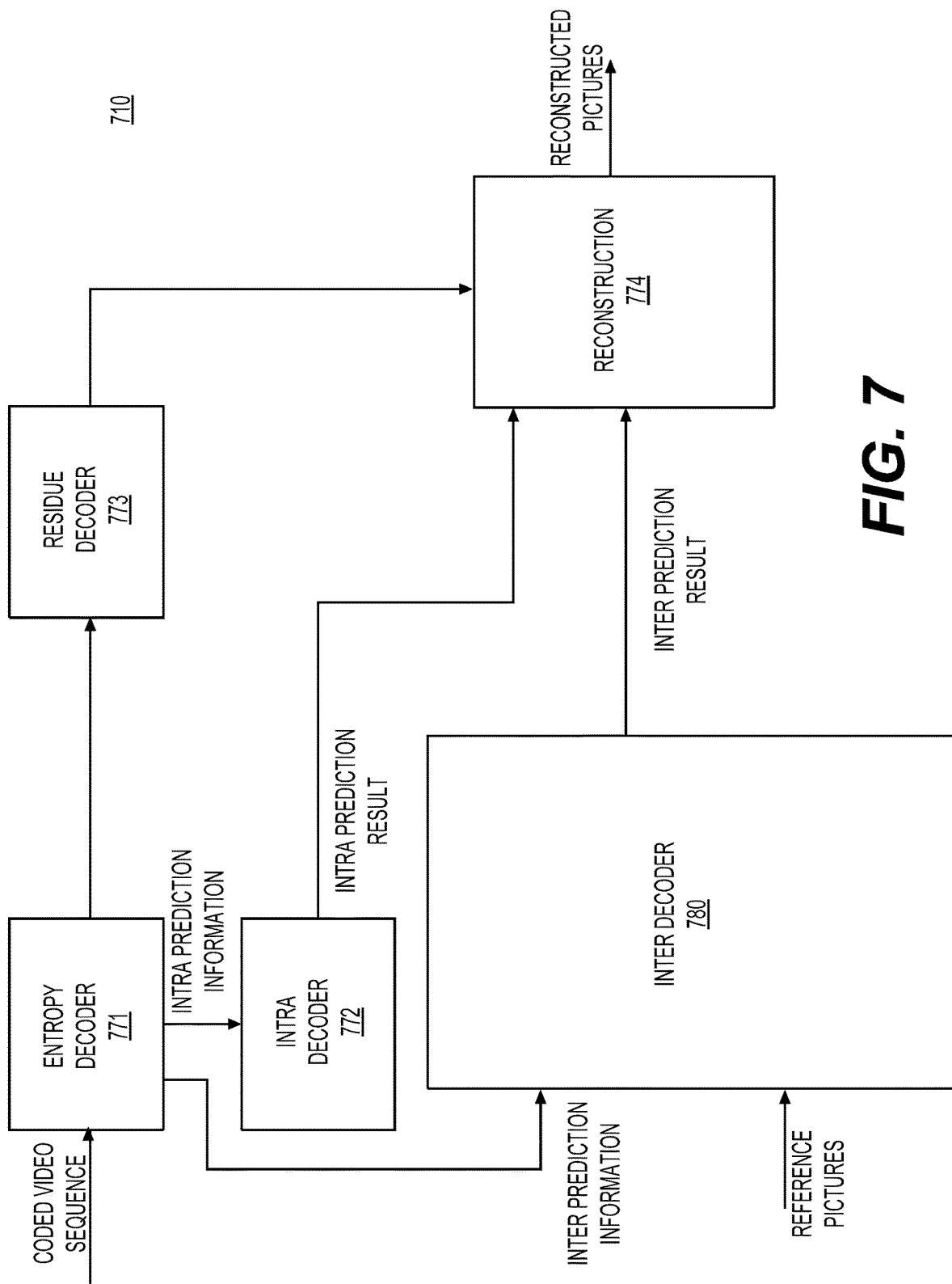
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (603), and the video decoders (310), (410), and (710) can be implemented using one or more processors that execute software instructions.

Intra Prediction in VVC

Figure 8A:
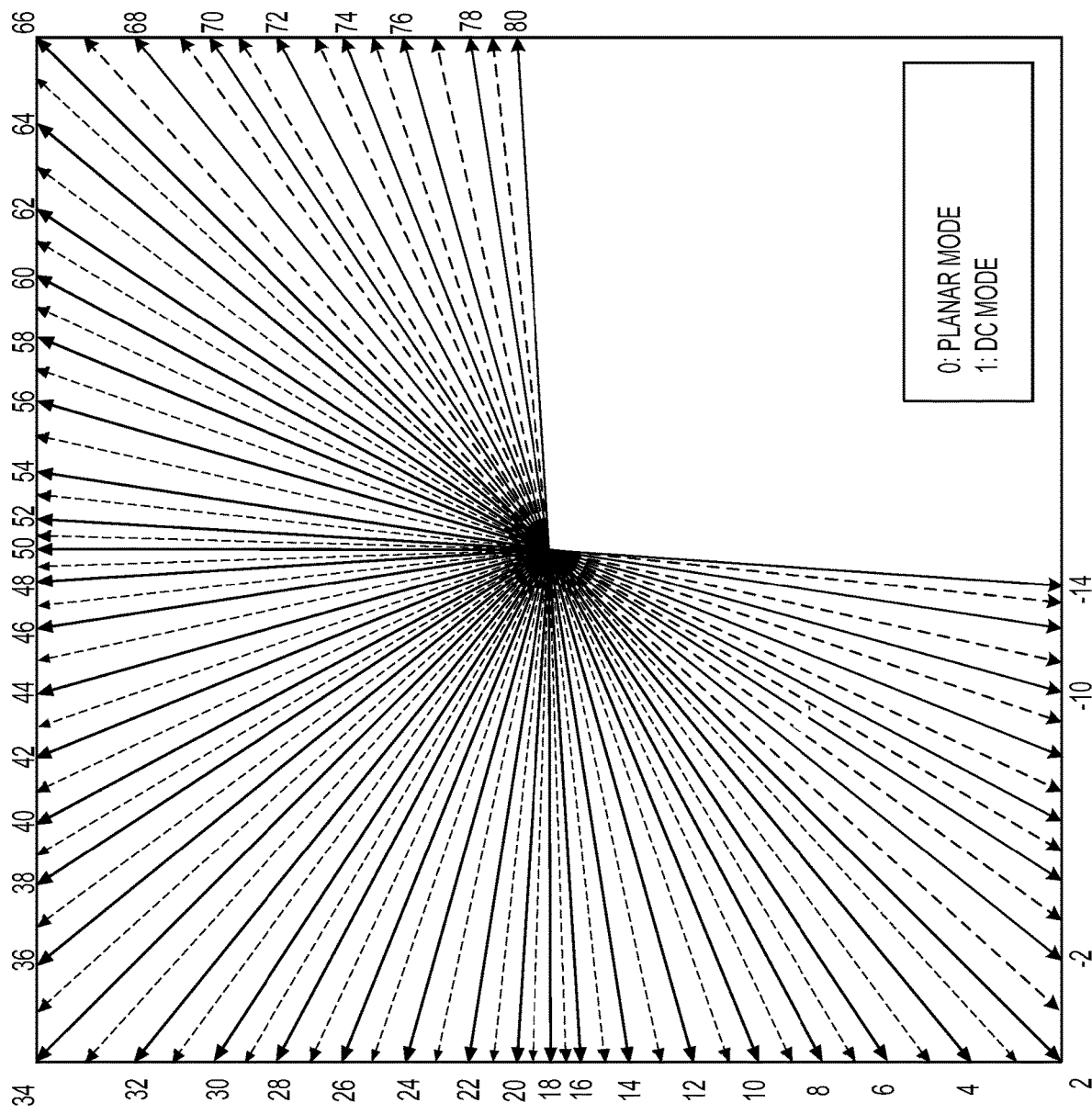
FIG. 8A shows an illustration of exemplary intra prediction directions and corresponding intra prediction modes in some examples (e.g., VVC)

FIG. 8A shows an illustration of exemplary intra prediction directions and corresponding intra prediction modes in some examples (e.g., VVC). In FIG. 8A, there are a total of 95 intra prediction modes (modes −14~80), among which mode 0 is planar mode (referred to as INTRA PLANAR), mode 1 is DC mode (referred to as INTRA DC), and other modes (modes −14~−1 and modes 2~80) are angular (or directional) modes (also referred to as INTRA_ANGULAR). Among the angular (or directional) modes, mode 18 (referred to as INTRA_ANGULAR18) is a horizontal mode, mode 50 (referred to as INTRA_ANGULAR50) is a vertical mode, and mode 2 (referred to as INTRA_ANGULAR2) is a diagonal mode that points to a bottom-left direction, mode 34 (referred to as INTRA_ANGULAR34) is a diagonal mode that points to a top-left direction, and mode 66 (referred to as INTRA_ANGULAR66) is a diagonal mode that points to a top-right direction. Modes −14~−1 and Modes 67~80 are referred to as wide-angle intra prediction (WAIP) modes. Example angular intra prediction modes and their corresponding intra prediction angles are tabulated in FIG. 8B.

Position Dependent Prediction Combination (PDPC) Filtering Process

According to aspects of the disclosure, position dependent prediction combination (PDPC) may be applied to the following intra modes without signaling: planar, DC, WAIP modes, horizontal, vertical, bottom-left angular mode (mode 2) and its 8 adjacent angular modes (modes 3~10), and top-right angular mode (mode 66) and its 8 adjacent angular modes (modes 58~65).

In an embodiment, a prediction sample pred'[x][y] located at a position (x, y) in a current block is predicted using an intra prediction mode (e.g., DC, planar, or an angular mode) and a linear combination of reference samples according to Eq. 1.

$$\text{pred}'[x][y]=(wL\times R(-1,y)+wT\times R(x,-1)-wTL\times R(-1,-1)+(64-wL-wT+wTL)\times \text{pred}[x][y]+32)>>6 \quad \text{(Eq. 1)}$$

where pred [x][y] is an intra prediction value resulted from the intra prediction mode, R(x, −1) represents a (unfiltered) reference sample that is located at a top reference line of the current sample (x, y) and has the same horizontal coordinate as the current sample (x, y), R(−1, y) represents a (unfiltered) reference sample that is located at a left reference line of the current sample (x, y) and has the same vertical coordinate as the current sample (x, y), R(−1, −1) represents a reference sample located at a top-left corner of the current block, and wT, wL, and wTL denote weighting factors.

In an embodiment, when the intra prediction mode is DC mode, the weight factors may be calculated by Eq. 2-Eq. 5.

$$wT=32>>((y<<1)>>n\text{Scale}) \quad \text{(Eq. 2)}$$

$$wL=32>>((x<<1)>>n\text{Scale}) \quad \text{(Eq. 3)}$$

$$wTL=+(wL>>4)+(wT>>4) \quad \text{(Eq. 4)}$$

$$n\text{Scale}=(\log 2(\text{width})+\log 2(\text{height})-2)>>2 \quad \text{(Eq. 5)}$$

where wT denotes the weighting factor for the reference sample (x, −1), wL denotes the weighting factor for the reference sample (−1, y), and wTL denotes the weighting factor for the top-left reference sample (−1, −1), nScale (referred to as weighting factor decrement rate) specifies how fast these weighting factors decrease along an axis (e.g., wL decreases from left to right along the x-axis, or wT decreases from top to bottom along the y-axis). The constant 32 in Eq. 2 and Eq. 3 denotes an initial weighting factor of a neighboring sample (e.g., a top neighboring sample, a left neighboring sample, or a top-left neighboring sample). The initial weighting factor is also assigned to a top-left sample of the current block. The weighting factors of neighboring samples in the PDPC filtering process are equal to or less than the initial weighting factor.

In an embodiment, when the intra prediction mode is planar mode, wTL is set equal to 0; when the intra prediction mode is horizontal mode, wTL is set equal to wT; and when the intra prediction mode is vertical mode, wTL is set equal to wL. The PDPC weighting factors can be calculated with add operations and shift operations. The value of pred'[x][y] can be computed in a single step using Eq. 1.

Figure 9B:
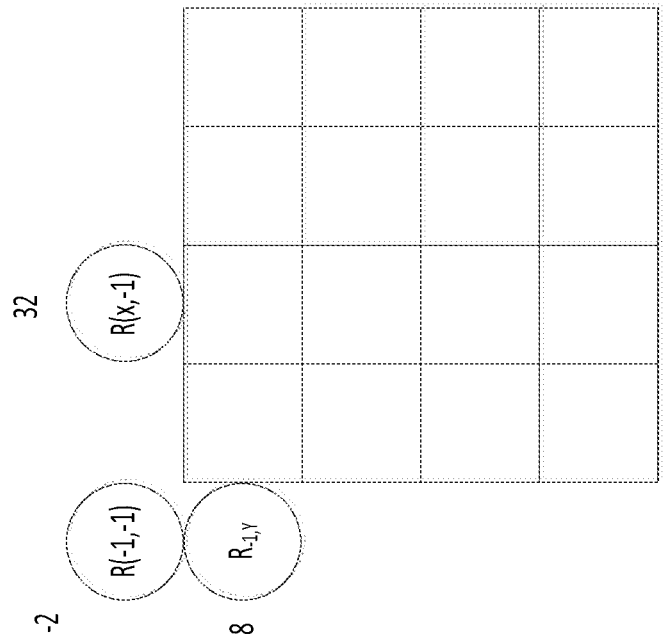
FIG. 9B shows exemplary weighting factors for a prediction sample at (1, 0) in DC mode in accordance with an embodiment.
Figure 9A:
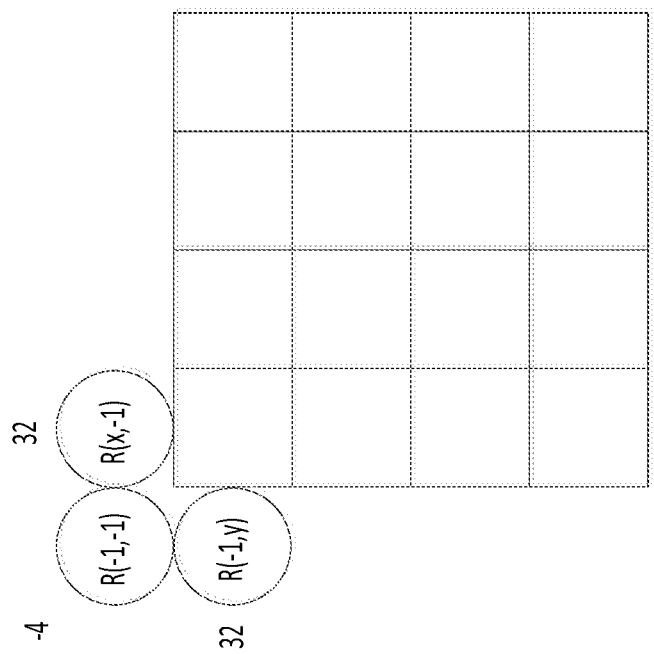
FIG. 9A shows exemplary weighting factors for a prediction sample at (0, 0) in DC mode in accordance with an embodiment.

FIG. 9A shows exemplary weighting factors for a prediction sample at (0, 0) in DC mode. In the FIG. 9A example, the current block is a 4×4 block (width=height=4), thus nScale is 0. Then, wT is 32, wL is 32, and wTL is 4.

FIG. 9B shows exemplary weighting factors for a prediction sample at (1, 0) in DC mode. In the FIG. 9B example, the current block is a 4×4 block (width=height=4), thus nScale is 0. Then, wT is 32, wL is 8, and wTL is 2.

In some embodiments, when the PDPC filtering process is applied to DC, planar, horizontal, and vertical intra modes, additional boundary filters are not needed, such as the HEVC DC mode boundary filter or horizontal/vertical mode edge filters.

Exemplary PDPC filtering process

In some examples, inputs of the PDPC filtering process include:
- the intra prediction mode that is represented by preModeIntra;
- the width of the current block that is represented nTbW;
- the height of the current block that is represented by nTbH;
- the width of the reference samples that is represented by refW;
- the height of the reference samples that is represented by refH;
- the predicted samples that are represented by predSamples [x][y], with x=0 . . . nTbW−1 and y=0 . . . nTbH−1;
- the unfiltered reference (also referred to as neighboring) samples that are represented by p[x][y], with x=−1, y=−1 . . . refH−1 and x=0 . . . refW−1, y=−1; and the color component of the current block that is represented by cIdx.

Depending on the value of cIdx, the function clip1Cmp is set as follows:

If cIdx is equal to 0, clip1Cmp is set equal to $Clip1_Y$

Otherwise, clip1Cmp is set equal to $Clip1_C$.

Further, outputs of the PDPC filtering process are the modified predicted samples predSamples'[x][y] with x=0 . . . nTbW−1 and y=0 nTbH−1.

Then, a scaling factor nScale may be calculated by Eq. 6.

$$nScale=((\text{Log } 2(nTbW)+\text{Log } 2(nTbH)-2)>>2) \quad \text{(Eq. 6)}$$

Further, a reference sample array mainRef[x] with x=0 . . . ref W may be defined as the array of unfiltered reference samples above the current block and another reference sample array sideRef[y] with y=0 . . . refH may be defined as the array of unfiltered reference samples to the left of the current block. The reference sample arrays mainRef[x] and sideRef[y] may be derived from unfiltered reference samples according to Eq. 7-Eq. 8, respectively.

$$mainRef[x]=p[x][-1] \quad \text{(Eq. 7)}$$

$$sideRef[y]=p[-1][y] \quad \text{(Eq. 8)}$$

For each location (x, y) in the current block, the PDPC calculation may use a reference sample at the top that is denoted as refT[x][y], a reference sample at the left that is denoted as refL[x][y], and a reference sample at the corner p[−1, −1]. The modified predicted sample may be calculated by Eq. 9, and the result is suitably clipped according to the variable cIdx that is indicative of the color component.

$$predSamples'[x][y]=(wL\times refL(x,y)+wT\times refT(x,y)-wTL\times p(-1,-1)+(64-wL-wT+wTL)\times predSamples[x][y]+32)>>6 \quad \text{(Eq. 9)}$$

The reference samples refT[x][y], refL[x][y], and the weighting factors wL, wT, and wTL can be determined based on the intra prediction mode preModeIntra.

When the intra prediction mode preModeIntra is equal to INTRA_PLANAR (e.g., 0, planar mode, or mode 0) or INTRA_DC (e.g., 1, DC mode, or mode 1), reference samples refT[x][y], refL[x][y], and the weighting factors wL, wT, and wTL may be determined according to Eq. 10-Eq. 14.

$$refL[x][y]=p[-1][y] \quad \text{(Eq. 10)}$$

$$refT[x][y]=p[x][-1] \quad \text{(Eq. 11)}$$

$$wT[y]=32>>((y<<1)>>nScale) \quad \text{(Eq. 12)}$$

$$wL[x]=32>>((x<<1)>>nScale) \quad \text{(Eq. 13)}$$

$$wTL[x][y]=(predModeIntra==INTRA\_DC)?((wL[x]>>4)+(wT[y]>>4)):0 \quad \text{(Eq. 14)}$$

Otherwise, when the intra prediction mode preModeIntra is equal to INTRA_ANGULAR18 (e.g., 18, horizontal mode, or mode 18) or INTRA_ANGULAR50 (e.g., 50, vertical mode, or mode 50), reference samples refT[x][y], refL[x][y], and the weighting factors wL, wT, and wTL may be determined according to Eq. 15-Eq. 19.

$$refL[x][y]=p[-1][y] \quad \text{(Eq. 15)}$$

$$refT[x][y]=p[x][-1] \quad \text{(Eq. 16)}$$

$$wT[y]=(predModeIntra==INTRA\_ANGULAR18)?32>>((y<<1)>>nScale):0 \quad \text{(Eq. 17)}$$

$$wL[x]=(predModeIntra==INTRA\_ANGULAR50)?32>>((x<<1)>>nScale):0 \quad \text{(Eq. 18)}$$

$$wTL[x][y]=(predModeIntra==INTRA\_ANGULAR18)?wT[y]:wL[x] \quad \text{(Eq. 19)}$$

Otherwise, when the intra prediction mode preModeIntra is equal to INTRA_ANGULAR2 (e.g., 2, or mode 2) or INTRA_ANGULAR66 (e.g., 66, or mode 66), reference samples refT[x][y], refL[x][y], and the weighting factors wL, wT, and wTL may be determined according to Eq. 20-Eq. 24.

$$refL[x][y]=p[-1][x+y+1] \quad \text{(Eq. 20)}$$

$$refT[x][y]=p[x+y+1][-1] \quad \text{(Eq. 21)}$$

$$wT[y]=(32>>1)>>((y<<1)>>nScale) \quad \text{(Eq. 22)}$$

$$wL[x]=(32>>1)>>((x<<1)>>nScale) \quad \text{(Eq. 23)}$$

$$wTL[x][y]=0 \quad \text{(Eq. 24)}$$

Otherwise, when the intra prediction mode preModeIntra is less than or equal to INTRA_ANGULAR10 (e.g., 10, or mode 10), for each location (x, y), variables dXPos[y], dXFrac[y], dXInt[y], and dX[x][y] may be derived based on a variable invAngle that is a function of the intra prediction mode preModeIntra. The invAngle can be determined based on a look-up table that stores a corresponding invAngle value to each intra prediction mode, and then the reference samples refT[x][y], refL[x][y], and the weighting factors wL, wT, and wTL can be determined based on the variables dXPos[y], dXFrac[y], dXInt[y], and dX[x][y].

The variables dXPos[y], dXFrac [y], dXInt[y], and dX[x][y] may be determined according to Eq. 25-Eq. 28.

$$dXPos[y]=((y+1)\times invAngle+2)>>2 \quad \text{(Eq. 25)}$$

$$dXFrac[y]=dXPos[y]\&63 \quad \text{(Eq. 26)}$$

$$dXInt[y]=dXPos[y]>>6 \quad \text{(Eq. 27)}$$

$$dX[x][y]=x+dXInt[y] \quad \text{(Eq. 28)}$$

Then, the reference samples refT[x][y], refL[x][y], and the weighting factors wL, wT, and wTL may be determined according to Eq. 29-Eq. 33.

$$refL[x][y]=0 \quad \text{(Eq. 29)}$$

$$refT[x][y]=(dX[x][y]<refW-1)?mainRef[dX[x][y]+(dXFrac[y]>>5)]:0 \quad \text{(Eq. 30)}$$

$$wT[y]=(dX[y]<refW-1)?32>>((y<<1)>>nScale):0 \quad \text{(Eq. 31)}$$

$$wL[x]=0 \quad \text{(Eq. 32)}$$

$$wTL[x][y]=0 \quad \text{(Eq. 33)}$$

Otherwise, when the intra prediction mode preModeIntra is greater than or equal to INTRA_ANGULAR58 (e.g., 58, or mode 58), variables dYPos[x], dYFrac[x], dYInt[x], and dY[x][y] may be derived based on a variable invAngle that is a function of the intra prediction mode preModeIntra. The invAngle can be determined based on a look-up table that stores a corresponding invAngle value for each intra prediction mode, and then the reference samples refT[x][y], refL[x][y], and the weighting factors wL, wT, and wTL may be determined based on the variables dYPos[x], dYFrac[x], dYInt[x], and dY[x][y].

The variables dYPos[x], dYFrac[x], dYInt[x], and dY[x][y] may be determined according to Eq. 34-Eq. 37.

$$dYPos[x]=((x+1)\times invAngle+2)>>2 \quad \text{(Eq. 34)}$$

$$dYFrac[x]=dYPos[x]\&63 \quad \text{(Eq. 35)}$$

$$dY\text{Int}[x]=dY\text{Pos}[x]>>6 \quad \text{(Eq. 36)}$$

$$dY[x][y]=x+dY\text{Int}[x] \quad \text{(Eq. 37)}$$

Then, the reference samples refT[x][y], refL[x][y], and the weighting factors wL, wT, and wTL may be determined according to Eq. 38-Eq. 42.

$$refL[x][y]=(dY[x][y]<refH-1)?sideRef[dY[x][y]+(dYFrac[x]>>5)]:0 \quad \text{(Eq. 38)}$$

$$refT[x][y]=0 \quad \text{(Eq. 39)}$$

$$wT[y]=0 \quad \text{(Eq. 40)}$$

$$wL[x]=(dY[x]<refH-1)?32>>((x<<1)>>n\text{Scale}):0 \quad \text{(Eq. 41)}$$

$$wTL[x][y]=0 \quad \text{(Eq. 42)}$$

Otherwise, when the variable preModeIntra is between modes 11-57 and is not one of mode 18 and mode 50, then the reference samples refT[x][y], refL[x][y], and the weighting factors wL, wT, and wTL are all set equal to 0.

Finally, the values of the filtered samples filtSamples[x][y], with x=0 . . . nTbW−1, y=0 . . . nTbH−1 may be derived according to Eq. 43.

$$\text{filtSamples}[x][y]=\text{clip1}Cmp((refL[x][y]\times wL+refT[x][y]\times wT-p[-1][-1]\times wTL[x][y]+(64-wL[x]-wT[y]+wTL[x][y])\times \text{predSamples}[x][y]+32)>>6) \quad \text{(Eq. 43)}$$

In some examples (e.g., in VVC), for a nTbW x nTbH transform block in a nCbW x nCbH current block, when performing the intra prediction with PDPC, if the current block is not coded in intra sub-partitions (ISP) mode (i.e., IntraSubPartitionsSplitType is equal to ISP_NO_SPLIT, as indicated in VVC Draft v5), the range of top available reference samples (refW) is set as 2×nTbW, and the range of left available reference samples (refH) is set as 2×nTbH. Otherwise, if ISP is applied for the current block (i.e., IntraSubPartitionsSplitType is not equal to ISP_NO_SPLIT, as indicated in VVC Draft v5), the range of top available reference samples (refW) is set as 2×nCbW, and the range of left available reference samples (refH) is set as 2×nCbH.

Improvement Techniques for PDPC

In the above section "Exemplary PDPC filtering process" or some related examples (such as in VTM5.0), different PDPC processes may be applied to the intra coded blocks with a diagonal intra prediction mode and modes adjacent to the diagonal intra prediction mode. For example, different PDPC processes may be applied to mode 2 and its adjacent modes (e.g., mode indices being equal to or less than 10). In another example, different PDPC processes are applied to mode 66 and its adjacent modes (e.g., mode indices being equal to or greater than 58). However, the prediction process of the diagonal prediction modes and their adjacent modes are similar, and there is no clear benefit to keep different PDPC process for these modes. Accordingly, aspects of the disclosure provide improvement techniques for PDPC process.

The present techniques or methods may be used separately or combined in any order. Note that, in the following sections, PDPC may be used as a general term for position dependent boundary filtering process for prediction samples which applies a linear combination of the prediction samples and the neighboring reconstructed samples using position-dependent weightings, and the results may be used to replace the original prediction samples. Accordingly, the PDPC process is not limited to the process described in the above section "Exemplary PDPC filtering process".

In addition, in the following descriptions, the diagonal intra prediction modes may be mode 2 and mode 66 in FIG. 8A, the modes adjacent to the mode 2 may have mode indices that are less than the horizontal mode (e.g., intra mode index is less than 18), and the modes adjacent to the mode 66 may have mode indices that are greater than the vertical mode (e.g., intra mode index is greater than 50).

According to aspects of the disclosure, the same PDPC process (e.g., same range of available reference samples, same weighting factors applied for each position) is applied to the diagonal intra prediction modes and the modes adjacent to the diagonal intra prediction modes.

In one embodiment, the diagonal intra prediction modes may be mode 2 and mode 66 in FIG. 8A, and the modes adjacent to the diagonal intra prediction modes may be modes −1~−14, modes 3~10, modes 58~65, and modes 67~80 in FIG. 8A.

In one embodiment, only a subset of available neighboring reference samples can be used by PDPC process for blocks using diagonal prediction modes, but all the available neighboring reference samples can be used by PDPC process for blocks with modes adjacent to the diagonal prediction modes. For example, only refW−K above neighboring reference samples and refH−K left neighboring reference samples are used in PDPC process for blocks predicted using diagonal intra prediction modes (e.g., mode 2 and mode 66 in VVC Draft v5), where refW and refH respectively denote the total number of available top and left reference samples (as specified in VVC Draft v5 clause "General intra sample prediction" and also described in the above section "Exemplary PDPC filtering process"), and K is a positive integer (e.g., 1, 2, 3, or 4).

In one embodiment, for the diagonal mode (e.g., mode 2 and mode 66 in VVC Draft v5), all the top and left available reference samples can be used for PDPC except the right most sample and bottom most sample.

Exemplary Modifications of PDPC Process

In some embodiments (e.g., following embodiments A~E), the PDPC process can be modified as follows.

Embodiment A

Example inputs of the PDPC filtering process include:
the intra prediction mode that is represented by preModeIntra;
the width of the current block that is represented nTbW;
the height of the current block that is represented by nTbH;
the width of the reference samples that is represented by refW;
the height of the reference samples that is represented by refH;
the predicted samples that are represented by predSamples [x][y], with x=0 . . . nTbW−1 and y=0 . . . nTbH−1;
the unfiltered reference (also referred to as neighboring) samples that are represented by p[x][y], with x=−1, y=−1 . . . refH−1 and x=0 . . . refW−1, y=−1; and
the color component of the current block that is represented by cIdx.

Depending on the value of cIdx, the function clip1Cmp may be set as follows:
If cIdx is equal to 0, clip1Cmp is set equal to $\text{Clip1}_Y$.
Otherwise, clip1Cmp is set equal to $\text{Clip1}_C$.

Further, outputs of the PDPC filtering process may be the modified predicted samples predSamples'[x][y] with x=0 . . . nTbW−1 and y=0 . . . nTbH−1.

Then, a scaling factor nScale may be calculated by Eq. 44.

$$nScale = ((\log 2(nTbW) + \log 2(nTbH) - 2) >> 2) \quad \text{(Eq. 44)}$$

Further, a reference sample array mainRef[x] with x=0 . . . refW may be defined as the array of unfiltered reference samples above the current block and another reference sample array sideRef[y] with y=0 . . . refH may be defined as the array of unfiltered reference samples to the left of the current block. The reference sample arrays mainRef[x] and sideRef[y] may be derived from unfiltered reference samples according to Eq. 45-Eq. 46, respectively.

$$mainRef[x] = p[x][-1] \quad \text{(Eq. 45)}$$

$$sideRef[y] = p[-1][y] \quad \text{(Eq. 46)}$$

For each location (x, y) in the current block, the PDPC calculation may use a reference sample at the top that is denoted as refT[x][y], a reference sample at the left that is denoted as refL[x][y], and a reference sample at the corner p[−1, −1]. In some examples, the modified predicted sample may be calculated by Eq. 47, and the result is suitably clipped according to the variable cIdx that is indicative of the color component.

$$predSamples'[x][y] = (wL \times refL(x,y) + wT \times refT(x,y) - wTL \times p(-1,-1) + (64 - wL - wT + wTL) \times predSamples[x][y] + 32) >> 6 \quad \text{(Eq. 47)}$$

The reference samples refT[x][y], refL[x][y], and the weighting factors wL, wT, and wTL can be determined based on the intra prediction mode preModeIntra.

When the intra prediction mode preModeIntra is equal to INTRA PLANAR (e.g., 0, planar mode, or mode 0) or INTRA DC (e.g., 1, DC mode, or mode 1), reference samples refT[x][y], refL[x][y], and the weighting factors wL, wT, and wTL may be determined according to Eq. 48-Eq. 52.

$$refL[x][y] = p[-1][y] \quad \text{(Eq. 48)}$$

$$refT[x][y] = p[x][-1] \quad \text{(Eq. 49)}$$

$$wT[y] = 32 >> ((y << 1) >> nScale) \quad \text{(Eq. 50)}$$

$$wL[x] = 32 >> ((x << 1) >> nScale) \quad \text{(Eq. 51)}$$

$$wTL[x][y] = (predModeIntra == INTRA\_DC)?((wL[x] >> 4) + (wT[y] >> 4)):0 \quad \text{(Eq. 52)}$$

Otherwise, when the intra prediction mode preModeIntra is equal to INTRA_ANGULAR18 (e.g., 18, horizontal mode, or mode 18) or INTRA_ANGULAR50 (e.g., 50, vertical mode, or mode 50), reference samples refT[x][y], refL[x][y], and the weighting factors wL, wT, and wTL may be determined according to Eq. 53-Eq. 57.

$$refL[x][y] = p[-1][y] \quad \text{(Eq. 53)}$$

$$refT[x][y] = p[x][-1] \quad \text{(Eq. 54)}$$

$$wT[y] = (predModeIntra == INTRA\_ANGULAR18)?32 >> ((y<<1)>>nScale):0 \quad \text{(Eq. 55)}$$

$$wL[x] = (predModeIntra == INTRA\_ANGULAR50)?32 >> ((x<<1)>>nScale):0 \quad \text{(Eq. 56)}$$

$$wTL[x][y] = (predModeIntra == INTRA\_ANGULAR18)?wT[y]:wL[x] \quad \text{(Eq. 57)}$$

Otherwise, when the intra prediction mode preModeIntra is less than or equal to INTRA_ANGULAR10 (e.g., 10, or mode 10), for each location (x,y), variables dXPos[y], dXFrac[y], dXInt[y], and dX[x][y] may be derived based on a variable invAngle that is a function of the intra prediction mode preModeIntra. The invAngle can be determined based on a look-up table that stores a corresponding invAngle value to each intra prediction mode, and then the reference samples refT[x][y], refL[x][y], and the weighting factors wL, wT, and wTL may be determined based on the variables dXPos[y], dXFrac[y], dXInt[y], and dX[x][y].

For example, the variables dXPos[y], dXFrac [y], dXInt [y], and dX[x][y] may be determined according to Eq. 58-Eq. 61.

$$dXPos[y] = ((y+1) \times invAngle + 2) >> 2 \quad \text{(Eq. 58)}$$

$$dXFrac[y] = dXPos[y] \& 63 \quad \text{(Eq. 59)}$$

$$dXInt[y] = dXPos[y] >> 6 \quad \text{(Eq. 60)}$$

$$dX[x][y] = x + dXInt[y] \quad \text{(Eq. 61)}$$

Then, the reference samples refT[x][y], refL[x][y], and the weighting factors wL, wT, and wTL may be determined according to Eq. 62-Eq. 66.

$$refL[x][y] = 0 \quad \text{(Eq. 62)}$$

$$refT[x][y] = (dX[x][y] < refW-1)?mainRef[dX[x][y] + (dXFrac[y] >> 5)]:0 \quad \text{(Eq. 63)}$$

$$wT[y] = (dX[y] < refW-1)?32 >> ((y<<1)>>nScale):0 \quad \text{(Eq. 64)}$$

$$wL[x] = 0 \quad \text{(Eq. 65)}$$

$$wTL[x][y] = 0 \quad \text{(Eq. 66)}$$

Otherwise, when the intra prediction mode preModeIntra is greater than or equal to INTRA_ANGULAR58 (e.g., 58, or mode 58), variables dYPos[x], dYFrac[x], dYInt[x], and dY[x][y] may be derived based on a variable invAngle that is a function of the intra prediction mode preModeIntra. The invAngle can be determined based on a look-up table that stores a corresponding invAngle value for each intra prediction mode, and then the reference samples refT[x][y], refL[x][y], and the weighting factors wL, wT, and wTL may be determined based on the variables dYPos[x], dYFrac[x], dYInt[x], and dY[x][y].

For example, the variables dYPos[x], dYFrac[x], dYInt [x], and dY[x][y] may be determined according to Eq. 67-Eq. 70.

$$dYPos[x] = ((x+1) \times invAngle + 2) >> 2 \quad \text{(Eq. 67)}$$

$$dYFrac[x] = dYPos[x] \& 63 \quad \text{(Eq. 68)}$$

$$dYInt[x] = dYPos[x] >> 6 \quad \text{(Eq. 69)}$$

$$dY[x][y] = x + dYInt[x] \quad \text{(Eq. 70)}$$

Then, the reference samples refT[x][y], refL [x][y], and the weighting factors wL, wT, and wTL may be determined according to Eq. 71-Eq. 75.

$$refL[x][y] = (dY[x][y] < refH-1)?sideRef[dY[x][y]] + (dYFrac[x] >> 5)]:0 \quad \text{(Eq. 71)}$$

$$refT[x][y] = 0 \quad \text{(Eq. 72)}$$

$$wT[y] = 0 \quad \text{(Eq. 73)}$$

$$wL[x] = (dY[x] < refH-1)?32 >> ((x<<1)>>nScale):0 \quad \text{(Eq. 74)}$$

$$wTL[x][y] = 0 \quad \text{(Eq. 75)}$$

Otherwise, when the variable preModeIntra is between modes 11-57 and is not one of mode 18 and mode 50, then the reference samples refT[x][y, refL[x][y], and the weighting factors wL, wT, and wTL are all set equal to 0.

Finally, the values of the filtered samples filtSamples[x][y], with x=0 . . . nTbW−1, y=0 . . . nTbH−1 may be derived according to Eq. 76.

$$\text{filtSamples}[x][y]=\text{clip1Cmp}((\text{refL}[x][y] \times wL + \text{refT}[x][y] \times wT - p[-1][-1] \times wTL[x][y] + (64 - wL[x] - wT[y] + wTL[x][y]) \times \text{predSamples}[x][y] + 32) >> 6) \quad \text{(Eq. 76)}$$

The difference between Embodiment A and the above section "Exemplary PDPC filtering process" is that in Embodiment A, the same PDPC process is applied to a diagonal intra prediction mode and modes adjacent to the diagonal intra prediction mode. In an example, the same PDPC process is applied to mode 2 and modes adjacent to the mode 2 (e.g., mode indices being equal to or less than 10). In another example, the same PDPC process is applied to mode 66 and modes adjacent to mode 66 (e.g., mode indices being equal to or greater than 58).

Embodiment B

Example inputs of the PDPC filtering process include:
the intra prediction mode that is represented by preModeIntra;
the width of the current block that is represented nTbW;
the height of the current block that is represented by nTbH;
the width of the reference samples that is represented by refW;
the height of the reference samples that is represented by refH;
the predicted samples that are represented by predSamples [x][y], with x=0 . . . nTbW−1 and y=0 . . . nTbH−1;
the unfiltered reference (also referred to as neighboring) samples that are represented by p[x][y], with x=−1, y=−1 . . . refH−1 and x=0 . . . refW−1, y=−1; and
the color component of the current block that is represented by cIdx.

Depending on the value of cIdx, the function clip1Cmp is set as follows:
If cIdx is equal to 0, clip1Cmp is set equal to $\text{Clip1}_Y$.
Otherwise, clip1Cmp is set equal to $\text{Clip1}_C$.

Further, outputs of the PDPC filtering process are the modified predicted samples predSamples'[x][y] with x=0 . . . nTbW−1 and y=0 . . . nTbH−1.

Then, a scaling factor nScale may be calculated by Eq. 77.

$$n\text{Scale}=((\text{Log }2(nTbW)+\text{Log }2(nTbH)-2)>>2) \quad \text{(Eq. 77)}$$

Further, a reference sample array mainRef [x] with x=0 . . . refW may be defined as the array of unfiltered reference samples above the current block and another reference sample array sideRef[y] with y=0 . . . refH may be defined as the array of unfiltered reference samples to the left of the current block. The reference sample arrays mainRef [x] and sideRef[y] may be derived from unfiltered reference samples according to Eq. 78-Eq. 79, respectively.

$$\text{mainRef}[x]=p[x][-1] \quad \text{(Eq. 78)}$$

$$\text{sideRef}[y]=p[-1][y] \quad \text{(Eq. 79)}$$

For each location (x, y) in the current block, the PDPC calculation may use a reference sample at the top that is denoted as refT[x][y], a reference sample at the left that is denoted as refL[x][y], and a reference sample at the corner p[−1, −1]. In some examples, the modified predicted sample may be calculated by Eq. 80, and the result is suitably clipped according to the variable cIdx that is indicative of the color component.

$$\text{predSamples}'[x][y]=(wL \times \text{refL}(x,y) + wT \times \text{refT}(x,y) - wTL \times p(-1,-1) + (64 - wL - wT + wTL) \times \text{predSamples}[x][y]+32)>>6 \quad \text{(Eq. 80)}$$

The reference samples refT[x][y], refL[x][y], and the weighting factors wL, wT, and wTL can be determined based on the intra prediction mode preModeIntra.

When the intra prediction mode preModeIntra is equal to INTRA_PLANAR (e.g., 0, planar mode, or mode 0) or INTRA_DC (e.g., 1, DC mode, or mode 1), reference samples refT[x][y], refL[x][y], and the weighting factors wL, wT, and wTL may be determined according to Eq. 81-Eq. 85.

$$\text{refL}[x][y]=p[-1][y] \quad \text{(Eq. 81)}$$

$$\text{refT}[x][y]=p[x][-1] \quad \text{(Eq. 82)}$$

$$wT[y]=32>>(y<<1)>>n\text{Scale}) \quad \text{(Eq. 83)}$$

$$wL[x]=32>>((x<<1)>>n\text{Scale}) \quad \text{(Eq. 84)}$$

$$wTL[x][y]=(\text{predModeIntra}==\text{INTRA\_DC})?((wL[x]>>4)+(wT[y]>>4)):0 \quad \text{(Eq. 85)}$$

Otherwise, when the intra prediction mode preModeIntra is equal to INTRA_ANGULAR18 (e.g., 18, horizontal mode, or mode 18) or INTRA_ANGULAR50 (e.g., 50, vertical mode, or mode 50), reference samples refT[x][y], refL[x][y], and the weighting factors wL, wT, and wTL may be determined according to Eq. 86-Eq. 90.

$$\text{refL}[x][y]=p[-1][y] \quad \text{(Eq. 86)}$$

$$\text{refT}[x][y]=p[x][-1] \quad \text{(Eq. 87)}$$

$$wT[y]=(\text{predModeIntra}==\text{INTRA\_ANGULAR18})?32>>((y<<1)>>n\text{Scale}):0 \quad \text{(Eq. 88)}$$

$$wL[x]=(\text{predModeIntra}==\text{INTRA\_ANGULAR50})?32>>((x<<1)>>n\text{Scale}):0 \quad \text{(Eq. 89)}$$

$$wTL[x][y]=(\text{predModeIntra}==\text{INTRA\_ANGULAR18})?wT[y]:wL[x] \quad \text{(Eq. 90)}$$

Otherwise, when the intra prediction mode preModeIntra is less than or equal to INTRA_ANGULAR10 (e.g., 10, or mode 10), for each location (x, y), variables dXPos[y], dXInt[y], and dX[x][y] may be derived based on a variable invAngle that is a function of the intra prediction mode preModeIntra. The invAngle can be determined based on a look-up table that stores a corresponding invAngle value to each intra prediction mode, and then the reference samples refT[x][y], refL[x][y], and the weighting factors wL, wT, and wTL may be determined based on the variables dXPos[y], dXInt[y], and dX[x][y].

For example, the variables dXPos[y], dXInt[y], and dX[x][y] may be determined according to Eq. 91-Eq. 93.

$$dX\text{Pos}[y]=((y+1) \times \text{invAngle}+2)>>2 \quad \text{(Eq. 91)}$$

$$dX\text{Int}[y]=(dX\text{Pos}[y]+32)>>6 \quad \text{(Eq. 92)}$$

$$dX[x][y]=x+dX\text{Int}[y] \quad \text{(Eq. 93)}$$

Then, the reference samples refT[x][y], refL[x][y], and the weighting factors wL, wT, and wTL may be determined according to Eq. 94-Eq. 98.

$$\text{refL}[x][y]=0 \quad \text{(Eq. 94)}$$

$$\text{refT}[x][y]=(dX[x][y]<\text{refW})?\text{mainRef}[dX[x][y]]:0 \quad \text{(Eq. 95)}$$

$$wT[y]=(dX[y]<\text{refW})?32>>(y<<1)>>n\text{Scale}):0 \quad \text{(Eq. 96)}$$

$$wL[x]=0 \quad \text{(Eq. 97)}$$

$$wTL[x][y]=0 \quad \text{(Eq. 98)}$$

Otherwise, when the intra prediction mode preModeIntra is greater than or equal to INTRA_ANGULAR58 (e.g., 58, or mode 58), variables dYPos[x], dYInt[x], and dY[x][y] may be derived based on a variable invAngle that is a function of the intra prediction mode preModeIntra. The invAngle can be determined based on a look-up table that stores a corresponding invAngle value for each intra prediction mode, and then the reference samples refT[x][y], refL[x][y], and the weighting factors wL, wT, and wTL may be determined based on the variables dYPos[x], dYInt[x], and dY[x][y].

For example, the variables dYPos[x], dYInt[x], and dY[x][y] may be determined according to Eq. 99-Eq. 101.

$$dYPos[x]=((x+1)\times invAngle+2)>>2 \quad \text{(Eq. 99)}$$

$$dYInt[x]=(dYPos[x]+32)>>6 \quad \text{(Eq. 100)}$$

$$dY[x][y]=x+dYInt[x] \quad \text{(Eq. 101)}$$

Then, the reference samples refT[x][y], refL[x][y], and the weighting factors wL, wT, and wTL may be determined according to Eq. 102-Eq. 106.

$$refL[x][y]=(dY[x][y]<refH)?sideRef[dY[x][y]]:0 \quad \text{(Eq. 102)}$$

$$refT[x][y]=0 \quad \text{(Eq. 103)}$$

$$wT[y]=0 \quad \text{(Eq. 104)}$$

$$wL[x]=(dY[x]<refH)?32>>((x<<1)>>nScale):0 \quad \text{(Eq. 105)}$$

$$wTL[x][y]=0 \quad \text{(Eq. 106)}$$

Otherwise, when the variable preModeIntra is between modes 11-57 and is not one of mode 18 and mode 50, then the reference samples refT[x][y, refL[x][y], and the weighting factors wL, wT, and wTL are all set equal to 0.

Finally, the values of the filtered samples filtSamples[x][y], with x=0 . . . nTbW-1, y=0 . . . nTbH-1 may be derived according to Eq. 107:

$$filtSamples[x][y]=clip1Cmp((refL[x][y]\times wL+refT[x][y]\times wT-p[-1][-1]\times wTL[x][y]+(64-wL[x]-wT[y]+wTL[x][y])\times predSamples[x][y]+32)>>6) \quad \text{(Eq. 107)}$$

The difference between Embodiment A and Embodiment B is that in Embodiment B, when the intra prediction mode preModeIntra is less than or equal to INTRA_ANGULAR10, dXFrac[y] (Eq. 59) is not calculated and dXInt[y] may be calculated in a different way (i.e., Eq. 60 vs. Eq. 92), so that refT[x][y] and wT[y] are calculated in different ways from Embodiment A (i.e., Eq. 63 vs. Eq. 95, and Eq. 64 vs. Eq. 96). Similarly, when the intra prediction mode preModeIntra is greater than or equal to INTRA_ANGULAR58, in Embodiment B, dYFrac[x] (Eq. 68) is not calculated and dYInt[x] may be calculated in a different way (Eq. 69 vs. Eq. 100), so that refL[x][y] and wL[y] are calculated in different ways from Embodiment A (i.e., Eq. 71 vs. Eq. 102, and Eq. 74 vs. Eq. 105).

Embodiment C

Example inputs of the PDPC filtering process include:
the intra prediction mode that is represented by preModeIntra;
the width of the current block that is represented nTbW;
the height of the current block that is represented by nTbH;
the width of the reference samples that is represented by refW;
the height of the reference samples that is represented by refH;
the predicted samples that are represented by predSamples [x][y], with x=0 . . . nTbW-1 and y=0 . . . nTbH-1;
the unfiltered reference (also referred to as neighboring) samples that are represented by p[x][y], with x=-1, y=-1 . . . refH-1 and x=0 . . . refW-1, y=-1; and
the color component of the current block that is represented by cIdx.

Depending on the value of cIdx, the function clip1Cmp is set as follows:
If cIdx is equal to 0, clip1Cmp is set equal to $Clip1_Y$.
Otherwise, clip1Cmp is set equal to $Clip1_C$.

Further, outputs of the PDPC filtering process are the modified predicted samples predSamples'[x][y] with x=0 . . . nTbW-1 and y=0 nTbH-1.

Then, a scaling factor nScale may be calculated by Eq. 108.

$$nScale=((Log\ 2(nTbW)+Log\ 2(nTbH)-2)>>2) \quad \text{(Eq. 108)}$$

Further, a reference sample array mainRef[x] with x=0 . . . refW may be defined as the array of unfiltered reference samples above the current block and another reference sample array sideRef[y] with y=0 . . . refH may be defined as the array of unfiltered reference samples to the left of the current block. The reference sample arrays mainRef[x] and sideRef[y] may be derived from unfiltered reference samples according to Eq. 109-Eq. 110, respectively.

$$mainRef[x]=p[x][-1] \quad \text{(Eq. 109)}$$

$$sideRef[y]=p[-1][y] \quad \text{(Eq. 110)}$$

For each location (x, y) in the current block, the PDPC calculation may use a reference sample at the top that is denoted as refT[x][y], a reference sample at the left that is denoted as refL[x][y], and a reference sample at the corner p[-1, -1]. In some examples, the modified predicted sample may be calculated by Eq. 111, and the result is suitably clipped according to the variable cIdx that is indicative of the color component.

$$predSamples'[x][y]=(wL\times refL(x,y)+wT\times refL(x,y)-wTL\times p(-1,-1)+(64-wL-wT+wTL)\times predSamples[x][y]+32)>>6 \quad \text{(Eq. 111)}$$

The reference samples refT[x][y], refL[x][y], and the weighting factors wL, wT, and wTL can be determined based on the intra prediction mode preModeIntra.

When the intra prediction mode preModeIntra is equal to INTRA PLANAR (e.g., 0, planar mode, or mode 0) or INTRA DC (e.g., 1, DC mode, or mode 1), reference samples refT[x][y], refL[x][y], and the weighting factors wL, wT, and wTL may be determined according to Eq. 112-Eq. 116.

$$refL[x][y]=p[-1][y] \quad \text{(Eq. 112)}$$

$$refT[x][y]=p[x][-1] \quad \text{(Eq. 113)}$$

$$wT[y]=32>>((y<<1)>>nScale) \quad \text{(Eq. 114)}$$

$$wL[x]=32>>((x<<1)>>nScale) \quad \text{(Eq. 115)}$$

$$wTL[x][y]=(predModeIntra==INTRA\_DC)?((wL[x]>>4)+(wT[y]>>4)):0 \quad \text{(Eq. 116)}$$

Otherwise, when the intra prediction mode preModeIntra is equal to INTRA_ANGULAR18 (e.g., 18, horizontal mode, or mode 18) or INTRA_ANGULAR50 (e.g., 50, vertical mode, or mode 50), reference samples refT[x][y], refL[x][y], and the weighting factors wL, wT, and wTL may be determined according to Eq. 117-Eq. 121.

$$refL[x][y]=p[-1][y] \qquad \text{(Eq. 117)}$$

$$refT[x][y]=p[x][-1] \qquad \text{(Eq. 118)}$$

$$wT[y]=(predModeIntra==INTRA\_ANGULAR18)\\?32>>((y<<1)>>nScale):0 \qquad \text{(Eq. 119)}$$

$$wL[x]=(predModeIntra==INTRA\_ANGULAR50)\\?32>>((x<<1)>>nScale):0 \qquad \text{(Eq. 120)}$$

$$wTL[x]=(predModeIntra==INTRA\_ANGULAR18)\\?wT[y]:wL[x] \qquad \text{(Eq. 121)}$$

Otherwise, when the intra prediction mode preModeIntra is less than or equal to INTRA_ANGULAR10 (e.g., 10, or mode 10), for each location (x,y), variables dXInt[y] and dX[x][y] may be derived based on a variable invAngle that is a function of the intra prediction mode preModeIntra. The invAngle can be determined based on a look-up table that stores a corresponding invAngle value to each intra prediction mode, and then the reference samples refT[x][y], refL[x][y], and the weighting factors wL, wT, and wTL may be determined based on the variables dXInt[y] and dX[x][y].

For example, the variables dXInt[y] and dX[x][y] may be determined according to Eq. 122-Eq. 123.

$$dXInt[y]=((y+1)\times invAngle+128)>>8 \qquad \text{(Eq. 122)}$$

$$dX[x][y]=x+dXInt[y] \qquad \text{(Eq. 123)}$$

Then, the reference samples refT[x][y], refL[x][y], and the weighting factors wL, wT, and wTL may be determined according to Eq. 124-Eq. 128.

$$refL[x][y]=0 \qquad \text{(Eq. 124)}$$

$$refT[x][y]=(dX[x][y]<refW)?mainRef[dX[x][y]]:0 \qquad \text{(Eq. 125)}$$

$$wT[y]=(dX[y]<refW)?32>>((y<<1)>>nScale):0 \qquad \text{(Eq. 126)}$$

$$wL[x]=0 \qquad \text{(Eq. 127)}$$

$$wTL[x][y]=0 \qquad \text{(Eq. 128)}$$

Otherwise, when the intra prediction mode preModeIntra is greater than or equal to INTRA_ANGULAR58 (e.g., 58, or mode 58), variables dYInt[x] and dY[x][y] may be derived based on a variable invAngle that is a function of the intra prediction mode preModeIntra. The invAngle can be determined based on a look-up table that stores a corresponding invAngle value for each intra prediction mode, and then the reference samples refT[x][y], refL[x][y], and the weighting factors wL, wT, and wTL may be determined based on the variables dYInt[x] and dY[x][y].

For example, the variables dYInt [x] and dY[x][y] may be determined according to Eq. 129-Eq. 130.

$$dYInt[x]=((x+1)\times invAngle+128)>>8 \qquad \text{(Eq. 129)}$$

$$dY[x][y]=x+dYInt[x] \qquad \text{(Eq. 130)}$$

Then, the reference samples refT[x][y], refL[x][y], and the weighting factors wL, wT, and wTL may be determined according to Eq. 131-Eq. 135.

$$refL[x][y]=(dY[x][y]<refH)?sideRef[dY[x][y]]:0 \qquad \text{(Eq. 131)}$$

$$refT[x][y]=0 \qquad \text{(Eq. 132)}$$

$$wT[y]=0 \qquad \text{(Eq. 133)}$$

$$wL[x]=(dY[x]<refH)?32>>((x<<1)>>nScale):0 \qquad \text{(Eq. 134)}$$

$$wTL[x][y]=0 \qquad \text{(Eq. 135)}$$

Otherwise, when the variable preModeIntra is between modes 11-57 and is not one of mode 18 and mode 50, then the reference samples refT[x] [y, refL[x][y], and the weighting factors wL, wT, and wTL are all set equal to 0.

Finally, the values of the filtered samples filtSamples[x][y], with x=0 . . . nTbW−1, y=0 . . . nTbH−1 may be derived according to Eq. 136:

$$filtSamples[x][y]=clip1Cmp((refL[x][y]\times wL+refT[x]\\ [y]\times wT-p[-1][-1]\times wTL[x][y]+(64-wL[x]-wT\\ [y]+wTL[x][y])\times predSamples[x][y]+32)>>6) \qquad \text{(Eq. 136)}$$

The difference between Embodiment B and Embodiment C is that in Embodiment C, when the intra prediction mode preModeIntra is less than or equal to INTRA_ANGULAR10, dXPos[y] (Eq. 91) is not calculated and dXInt[y] may be calculated in a different way (i.e., Eq. 92 vs. Eq. 122). Similarly, when the intra prediction mode preModeIntra is greater than or equal to INTRA_ANGULAR58, in Embodiment C, dYPos[x] (Eq. 99) is not calculated and dYInt[x] may be calculated in a different way (Eq. 100 vs. Eq. 129).

Embodiment D

Example inputs of the PDPC filtering process include:
the intra prediction mode that is represented by preModeIntra;
the width of the current block that is represented nTbW;
the height of the current block that is represented by nTbH;
the width of the reference samples that is represented by refW;
the height of the reference samples that is represented by refH;
the predicted samples that are represented by predSamples [x][y], with x=0 . . . nTbW−1 and y=0 . . . nTbH−1;
the unfiltered reference (also referred to as neighboring) samples that are represented by p[x][y], with x=−1, y=−1 . . . refH−1 and x=0 . . . refW−1, y=−1; and
the color component of the current block that is represented by cIdx Depending on the value of cIdx, the function clip1Cmp is set as follows:
If cIdx is equal to 0, clip1Cmp is set equal to $Clip1_Y$.
Otherwise, clip1Cmp is set equal to $Clip1_C$.
Further, outputs of the PDPC filtering process are the modified predicted samples predSamples'[x][y] with x=0 . . . nTbW−1 and y=0 . . . nTbH−1.

Then, a scaling factor nScale may be calculated by Eq. 137.

$$nScale=((Log\ 2(nTbW)+Log\ 2(nTbH)-2)>>2) \qquad \text{(Eq. 137)}$$

Further, a reference sample array mainRef[x] with x=0 . . . refW may be defined as the array of unfiltered reference samples above the current block and another reference sample array sideRef[y] with y=0 . . . refH may be defined as the array of unfiltered reference samples to the left of the current block. The reference sample arrays mainRef[x] and sideRef[y] may be derived from unfiltered reference samples according to Eq. 138-Eq. 139, respectively.

$$mainRef[x]=p[x][-1] \qquad \text{(Eq. 138)}$$

$$sideRef[y]=p[-1][y] \qquad \text{(Eq. 139)}$$

For each location (x, y) in the current block, the PDPC calculation may use a reference sample at the top that is denoted as refT[x][y], a reference sample at the left that is denoted as refL[x][y], and a reference sample at the corner p[−1, −1]. The modified predicted sample may be calculated by Eq. 140, and the result is suitably clipped according to the variable cIdx that is indicative of the color component.

$$predSamples'[x][y]=(wL \times refL(x,y)+wT \times refT(x,y)-wTL \times p(-1,-1)+(64-wL-wT+wTL) \times predSamples[x][y]+32)>>6 \quad (Eq. 140)$$

The reference samples refT[x][y], refL[x][y], and the weighting factors wL, wT, and wTL can be determined based on the intra prediction mode preModeIntra.

When the intra prediction mode preModeIntra is equal to INTRA_PLANAR (e.g., 0, planar mode, or mode 0) or INTRA_DC (e.g., 1, DC mode, or mode 1), reference samples refT[x][y], refL[x][y], and the weighting factors wL, wT, and wTL may be determined according to Eq. 141-Eq. 145.

$$refL[x][y]=p[-1][y] \quad (Eq. 141)$$

$$refT[x][y]=p[x][-1] \quad (Eq. 142)$$

$$wT[y]=32>>((y<<1)>>nScale) \quad (Eq. 143)$$

$$wL[x]=32>>((x<<1)>>nScale) \quad (Eq. 144)$$

$$wTL[x][y]=(predModeIntra==INTRA\_DC)?((wL[x]>>4)+(wT[y]>>4)):0 \quad (Eq. 145)$$

Otherwise, when the intra prediction mode preModeIntra is equal to INTRA_ANGULAR18 (e.g., 18, horizontal mode, or mode 18) or INTRA_ANGULAR50 (e.g., 50, vertical mode, or mode 50), reference samples refT[x][y], refL[x][y], and the weighting factors wL, wT, and wTL may be determined according to Eq. 146-Eq. 150.

$$refL[x][y]=p[-1][y] \quad (Eq. 146)$$

$$refT[x][y]=p[x][-1] \quad (Eq. 147)$$

$$wT[y]=(predModeIntra==INTRA\_ANGULAR18)?32>>((y<<1)>>nScale):0 \quad (Eq. 148)$$

$$wL[x]=(predModeIntra==INTRA\_ANGULAR50)?32>>((x<<1)>>nScale):0 \quad (Eq. 149)$$

$$wTL[x][y]=(predModeIntra==INTRA\_ANGULAR18)?wT[y]:wL[x] \quad (Eq. 150)$$

Otherwise, when the intra prediction mode preModeIntra is equal to INTRA_ANGULAR2 (e.g., 2, or mode 2), for each location (x, y), variables dXPos[y], dXFrac[y], dXInt[y], and dX[x][y] may be derived based on a variable invAngle that is a function of the intra prediction mode preModeIntra. The invAngle can be determined based on a look-up table that stores a corresponding invAngle value to each intra prediction mode, and then the reference samples refT[x][y], refL[x][y], and the weighting factors wL, wT, and wTL can be determined based on the variables dXPos[y], dXFrac[y], dXInt[y], and dX[x][y].

The variables dXPos[y], dXFrac [y], dXInt[y], and dX[x][y] may be determined according to Eq. 151-Eq. 154.

$$dXPos[y]=((y+1) \times invAngle+2)>>2 \quad (Eq. 151)$$

$$dXFrac[y]=dXPos[y]\&63 \quad (Eq. 152)$$

$$dXInt[y]=dXPos[y]>>6 \quad (Eq. 153)$$

$$dX[x][y]=x+dXInt[y] \quad (Eq. 154)$$

Then, the reference samples refT[x][y], refL[x][y], and the weighting factors wL, wT, and wTL may be determined according to Eq. 155-Eq. 159.

$$refL[x][y]=0 \quad (Eq. 155)$$

$$refT[x][y]=(dX[x][y]<refW-1)?mainRef[dX[x][y]+(dXFrac[y]>>5)]:0 \quad (Eq. 156)$$

$$wT[y]=(dX[y]<refW-1)?32>>((y<<1)>>nScale):0 \quad (Eq. 157)$$

$$wL[x]=0 \quad (Eq. 158)$$

$$wTL[x][y]=0 \quad (Eq. 159)$$

Otherwise, when the intra prediction mode preModeIntra is less than or equal to INTRA_ANGULAR10 (e.g., 10, or mode 10), for each location (x, y), variables dXPos[y], dXFrac[y], dXInt[y], and dX[x][y] may be derived based on a variable invAngle that is a function of the intra prediction mode preModeIntra. The invAngle can be determined based on a look-up table that stores a corresponding invAngle value to each intra prediction mode, and then the reference samples refT[x][y], refL[x][y], and the weighting factors wL, wT, and wTL can be determined based on the variables dXPos[y], dXFrac[y], dXInt[y], and dX[x][y].

The variables dXPos[y], dXFrac [y], dXInt[y], and dX[x][y] may be determined according to Eq. 160-Eq. 163.

$$dXPos[y]=((y+1) \times invAngle+2)>>2 \quad (Eq. 160)$$

$$dXFrac[y]=dXPos[y]\&63 \quad (Eq. 161)$$

$$dXInt[y]=dXPos[y]>>6 \quad (Eq. 162)$$

$$dX[x][y]=x+dXInt[y] \quad (Eq. 163)$$

Then, the reference samples refT[x][y], refL[x][y], and the weighting factors wL, wT, and wTL may be determined according to Eq. 164-Eq. 168.

$$refL[x][y]=0 \quad (Eq. 164)$$

$$refT[x][y]=(dX[x][y]<refW-1)?mainRef[dX[x][y]+(dXFrac[y]>>5)]:0 \quad (Eq. 165)$$

$$wT[y]=(dX[y]<refW-1)?32>>((y<<1)>>nScale):0 \quad (Eq. 166)$$

$$wL[x]=0 \quad (Eq. 167)$$

$$wTL[x][y]=0 \quad (Eq. 168)$$

Otherwise, when the intra prediction mode preModeIntra is equal to INTRA_ANGULAR66 (e.g., 66, or mode 66), variables dYPos[x], dYFrac[x], dYInt[x], and dY[x][y] may be derived based on a variable invAngle that is a function of the intra prediction mode preModeIntra. The invAngle can be determined based on a look-up table that stores a corresponding invAngle value for each intra prediction mode, and then the reference samples refT[x][y], refL[x][y], and the weighting factors wL, wT, and wTL may be determined based on the variables dYPos[x], dYFrac[x], dYInt[x], and dY[x][y].

The variables dYPos[x], dYFrac[x], dYInt[x], and dY[x][y] may be determined according to Eq. 169-Eq. 172.

$$dYPos[x]=((x+1) \times invAngle+2)>>2 \quad (Eq. 169)$$

$$dYFrac[x]=dYPos[x]\&63 \quad (Eq. 170)$$

$$dYInt[x]=dYPos[x]>>6 \quad (Eq. 171)$$

$$dY[x][y]=x+dYInt[x] \quad (Eq. 172)$$

Then, the reference samples refT[x][y], refL[x][y], and the weighting factors wL, wT, and wTL may be determined according to Eq. 173-Eq. 177.

$$refL[x][y]=(dY[x][y]<refH-1)?sideRef[dY[x][y]+(dY\text{-}Frac[x]>>5)]:0 \quad \text{(Eq. 173)}$$

$$refT[x][y]=0 \quad \text{(Eq. 174)}$$

$$wT[y]=0 \quad \text{(Eq. 175)}$$

$$wL[x]=(dY[x]<refH-1)?32>>((x<<1)>>nScale):0 \quad \text{(Eq. 176)}$$

$$wTL[x][y]=0 \quad \text{(Eq. 177)}$$

Otherwise, when the intra prediction mode preModeIntra is greater than or equal to INTRA_ANGULAR58 (e.g., 58, or mode 58), variables dYPos[x], dYFrac[x], dYInt[x], and dY[x][y] may be derived based on a variable invAngle that is a function of the intra prediction mode preModeIntra. The invAngle can be determined based on a look-up table that stores a corresponding invAngle value for each intra prediction mode, and then the reference samples refT[x][y], refL[x][y], and the weighting factors wL, wT, and wTL may be determined based on the variables dYPos[x], dYFrac[x], dYInt[x], and dY[x][y].

The variables dYPos[x], dYFrac[x], dYInt[x], and dY[x][y] may be determined according to Eq. 178-Eq. 181.

$$dYPos[x]=((x+1)\times invAngle+2)>>2 \quad \text{(Eq. 178)}$$

$$dYFrac[x]=dYPos[x]\&63 \quad \text{(Eq. 179)}$$

$$dYInt[x]=dYPos[x]>>6 \quad \text{(Eq. 180)}$$

$$dY[x][y]=x+dYInt[x] \quad \text{(Eq. 181)}$$

Then, the reference samples refT[x][y], refL[x][y], and the weighting factors wL, wT, and wTL may be determined according to Eq. 182-Eq. 186.

$$refL[x][y]=(dY[x][y]<refH-1)?sideRef[dY[x][y]+(dY\text{-}Frac[x]>>5)]:0 \quad \text{(Eq. 182)}$$

$$refT[x][y]=0 \quad \text{(Eq. 183)}$$

$$wT[y]=0 \quad \text{(Eq. 184)}$$

$$wL[x]=(dY[x]<refH-1)?32>>((x<<1)>>nScale):0 \quad \text{(Eq. 185)}$$

$$wTL[x][y]=0 \quad \text{(Eq. 186)}$$

Otherwise, when the variable preModeIntra is between modes 11-57 and is not one of mode 18 and mode 50, then the reference samples refT[x][y], refL[x][y], and the weighting factors wL, wT, and wTL are all set equal to 0.

Finally, the values of the filtered samples filtSamples[x][y], with x=0 ... nTbW-1, y=0 ... nTbH-1 may be derived according to Eq. 187:

$$filtSamples[x][y]=clip1Cmp((refL[x][y]\times wL+refT[x][y]\times wT-p[-1][-1]\times wTL[x][y]+(64-wL[x]-wT[y]+wTL[x][y])\times predSamples[x][y]+32)>>6) \quad \text{(Eq. 187)}$$

The Embodiment D is similar to Embodiment A but describes a different modified PDPC process for mode 2 and mode 66.

Embodiment E

Example inputs of the PDPC filtering process includes:
the intra prediction mode that is represented by preModeIntra;
the width of the current block that is represented nTbW;
the height of the current block that is represented by nTbH;
the width of the reference samples that is represented by refW;
the height of the reference samples that is represented by refH;
the predicted samples that are represented by predSamples [x][y], with x=0 ... nTbW-1 and y=0 ... nTbH-1;
the unfiltered reference (also referred to as neighboring) samples that are represented by p[x][y], with x=-1, y=-1 ... refH-1 and x=0 ... refW-1, y=-1; and
the color component of the current block that is represented by cIdx.

Depending on the value of cIdx, the function clip1Cmp is set as follows:
If cIdx is equal to 0, clip1Cmp is set equal to $Clip1_Y$.
Otherwise, clip1Cmp is set equal to $Clip1_C$.

Further, outputs of the PDPC filtering process are the modified predicted samples predSamples'[x][y] with x=0 ... nTbW-1 and y=0 ... nTbH-1.

Then, a scaling factor nScale may be calculated by Eq. 188.

$$nScale=((Log\ 2(nTbW)+Log\ 2(nTbH)-2)>>2) \quad \text{(Eq. 188)}$$

Further, a reference sample array mainRef [x] with x=0 ... refW may be defined as the array of unfiltered reference samples above the current block and another reference sample array sideRef[y] with y=0 ... refH may be defined as the array of unfiltered reference samples to the left of the current block. The reference sample arrays mainRef[x] and sideRef[y] may be derived from unfiltered reference samples according to Eq. 189-Eq. 190, respectively.

$$mainRef[x]=p[x][-1] \quad \text{(Eq. 189)}$$

$$sideRef[y]=p[-1][y] \quad \text{(Eq. 190)}$$

For each location (x, y) in the current block, the PDPC calculation may use a reference sample at the top that is denoted as refT[x][y], a reference sample at the left that is denoted as refL[x][y], and a reference sample at the corner p[-1, -1]. In some examples, the modified predicted sample may be calculated by Eq. 191, and the result is suitably clipped according to the variable cIdx that is indicative of the color component.

$$predSamples'[x][y]=(wL\times refL(x,y)+wT\times refT(x,y)-wTL\times p(-1,-1)+(64-wL-wT+wTL)\times predSamples[x][y]+32)>>6 \quad \text{(Eq. 191)}$$

The reference samples refT[x][y], refL[x][y], and the weighting factors wL, wT, and wTL can be determined based on the intra prediction mode preModeIntra.

When the intra prediction mode preModeIntra is equal to INTRA PLANAR (e.g., 0, planar mode, or mode 0) or INTRA DC (e.g., 1, DC mode, or mode 1), reference samples refT[x][y], refL[x][y], and the weighting factors wL, wT, and wTL may be determined according to Eq. 192-Eq. 196.

$$refL[x][y]=p[-1][y] \quad \text{(Eq. 192)}$$

$$refT[x][y]=p[x][-1] \quad \text{(Eq. 193)}$$

$$wT[y]=32>>((y<<1)>>nScale) \quad \text{(Eq. 194)}$$

$$wL[x]=32>>((x<<1)>>nScale) \quad \text{(Eq. 195)}$$

$$wTL[x][y]=(predModeIntra==INTRA\_DC)?((wL[x]>>4)+(wT[y]>>4)):0 \quad \text{(Eq. 196)}$$

Otherwise, when the intra prediction mode preModeIntra is equal to INTRA_ANGULAR18 (e.g., 18, horizontal mode, or mode 18) or INTRA_ANGULAR50 (e.g., 50, vertical mode, or mode 50), reference samples refT[x][y], refL[x][y], and the weighting factors wL, wT, and wTL may be determined according to Eq. 197-Eq. 201.

$$refL[x][y]=p[-1][y] \quad \text{(Eq. 197)}$$

$$refT[x][y]=p[x][-1] \quad \text{(Eq. 198)}$$

$$wT[y]=(predModeIntra==INTRA\_ANGULAR18)?\\32>>((y<<1)>>nScale):0 \quad \text{(Eq. 199)}$$

$$wL[x]=(predModeIntra==INTRA\_ANGULAR50)?\\32>>((x<<1)>>nScale):0 \quad \text{(Eq. 200)}$$

$$wTL[x][y]=\\(predModeIntra==INTRA\_ANGULAR18)?\\wT[y]:wL[x] \quad \text{(Eq. 201)}$$

Otherwise, when the intra prediction mode preModeIntra is less than or equal to INTRA_ANGULAR10 (e.g., 10, or mode 10), for each location (x,y), variables dXInt[y] and dX[x][y] may be derived based on a variable invAngle that is a function of the intra prediction mode preModeIntra. The invAngle can be determined based on a look-up table that stores a corresponding invAngle value to each intra prediction mode, and then the reference samples refT[x][y], refL[x][y], and the weighting factors wL, wT, and wTL may be determined based on the variables dXInt[y] and dX[x][y].

For example, the variables dXInt[y] and dX[x][y] may be determined according to Eq. 202-Eq. 203.

$$dXInt[y]=((y+1)\times invAngle+128)>>8 \quad \text{(Eq. 202)}$$

$$dX[x][y]=x+dXInt[y] \quad \text{(Eq. 203)}$$

Then, the reference samples refT[x][y], refL[x][y], and the weighting factors wL, wT, and wTL may be determined according to Eq. 204-Eq. 208.

$$refL[x][y]=0 \quad \text{(Eq. 204)}$$

$$refT[x][y]=(dXInt[y]<refW-width-1)?mainRef[dX[x][y]]:0 \quad \text{(Eq. 205)}$$

$$wT[y]=32>>((y<<1)>>nScale) \quad \text{(Eq. 206)}$$

$$wL[x]=0 \quad \text{(Eq. 207)}$$

$$wTL[x][y]=0 \quad \text{(Eq. 208)}$$

Otherwise, when the intra prediction mode preModeIntra is greater than or equal to INTRA_ANGULAR58 (e.g., 58, or mode 58), variables dYInt[x] and dY[x][y] may be derived based on a variable invAngle that is a function of the intra prediction mode preModeIntra. The invAngle can be determined based on a look-up table that stores a corresponding invAngle value for each intra prediction mode, and then the reference samples refT[x][y], refL[x][y], and the weighting factors wL, wT, and wTL may be determined based on the variables dYInt[x] and dY[x][y].

For example, the variables dYInt[x] and dY[x][y] may be determined according to Eq. 209-Eq. 210.

$$dYInt[x]=((x+1)\times invAngle+128)>>8 \quad \text{(Eq. 209)}$$

$$dY[x][y]=x+dYInt[x] \quad \text{(Eq. 210)}$$

Then, the reference samples refT[x][y], refL[x][y], and the weighting factors wL, wT, and wTL may be determined according to Eq. 211-Eq. 215.

$$refL[x][y]=(dYInt[y]<refH-height-1)?sideRef[dY[x][y]]:0 \quad \text{(Eq. 211)}$$

$$refT[x][y]=0 \quad \text{(Eq. 212)}$$

$$wT[y]=0 \quad \text{(Eq. 213)}$$

$$wL[x]=32>>((x<<1)>>nScale) \quad \text{(Eq. 214)}$$

$$wTL[x][y]=0 \quad \text{(Eq. 215)}$$

Otherwise, when the variable preModeIntra is between modes 11-57 and is not one of mode 18 and mode 50, then the reference samples refT[x][y, refL[x][y], and the weighting factors wL, wT, and wTL are all set equal to 0.

Finally, the values of the filtered samples filtSamples[x][y], with x=0 ... nTbW−1, y=0 ... nTbH−1 may be derived according to Eq. 216:

$$filtSamples[x][y]=clip1Cmp((refL[x][y]\times wL+refT[x][y]\times wT-p[-1][-1]\times wTL[x][y]+(64-wL[x]-wT[y]+wTL[x][y])\times predSamples[x][y]+32)>>6) \quad \text{(Eq. 216)}$$

The difference between Embodiment C and Embodiment E is that in Embodiment E, when the intra prediction mode preModeIntra is less than or equal to INTRA_ANGULAR10, refT[x][y] may be calculated in a different way (i.e., Eq. 125 vs. Eq. 205). Similarly, when the intra prediction mode preModeIntra is greater than or equal to INTRA_ANGULAR58, refL[x][y] may be calculated in a different way (i.e., Eq. 131 vs. Eq. 211).

Early Termination of PDPC Process

According to embodiments of the disclosure, for intra prediction modes adjacent to the diagonal intra prediction modes, such as modes −1~−14, modes 3~10, modes 58~65, and modes 67~80 in FIG. 8A, the PDPC process can have an early termination and the early termination depends on a fractional position that the intra prediction direction is pointing on the side reference samples which are used in the PDPC process.

In one embodiment, the assignment of reference sample value used in PDPC process is modified as follows.

For intra prediction modes adjacent to mode 2, Eq. 30 is modified as Eq. 217.

$$refT[x][y]=((dX[x][y]+(dXFrac[y]>>5))<refW-1)?\\mainRef[dX[x][y]+(dXFrac[y]>>5)]:0 \quad \text{(Eq. 217)}$$

For intra prediction modes adjacent to mode 66, Eq. 38 is modified as Eq. 218.

$$refL[x][y]=((dY[x][y]+(dXFrac[y]>>5))<refH-1)?\\sideRef[dY[x][y]+(dYFrac[x]>>5)]:0 \quad \text{(Eq. 218)}$$

Reference Sample Checking

In some related embodiments (e.g., in VVC), for a current sample in the PDPC process, a per-sample checking is needed to determine whether a reference sample of the current sample is within a specified range. If the reference sample is not within the specified range, the PDPC weighting factors are set to 0 for the current sample, as described in, for example, Eq. 30, Eq. 31, Eq. 38, and Eq. 41. However, this per-sample checking may not be desired, especially for software optimization using single instruction multiple data (SIMD) techniques.

According to some embodiments, the per-sample checking in the PDPC process, which is used to determine whether a reference sample is within the range of available reference samples, is replaced by a per-row or per-column checking. In an embodiment, the checking condition only depends on the number of available left reference samples, the prediction block height, and the horizontal coordinate value of the current sample to be filtered by the PDPC process. In another embodiment, the checking condition only depends on the number of available top reference samples, the prediction block width, and the vertical coordinate value of the current sample to be filtered by the PDPC process.

In an embodiment, for vertical-like intra prediction (i.e., a prediction direction is closer to the vertical intra prediction direction than the horizontal prediction direction), the checking is done per column, and the checking condition only depends on at least one of the number of available left reference samples, the prediction block height, and the horizontal coordinate value of the current sample to be filtered by the PDPC process.

In an embodiment, for horizontal-like intra prediction (i.e., a prediction direction is closer to the horizontal intra prediction direction than the vertical prediction direction), the checking is done per row, and the checking condition only depends on at least one of the number of available top reference samples, the prediction block width, and the vertical coordinate value of the current sample to be filtered by the PDPC process.

According to some embodiments, the PDPC process is applied to an intra prediction mode when the intra prediction angle of the intra prediction mode is equal to or greater than a preset value, such as $2^k/32$, wherein k is a non-negative integer, such as 3 or 4.

In an embodiment, for vertical-like intra prediction (i.e., a prediction direction is closer to the vertical intra prediction direction other than the horizontal prediction direction), only the first (width/($2^{5-k}$)) (or min(width, height)/($2^{5-k}$)) columns of current block will be processed by the PDPC process.

In an embodiment, for horizontal-like intra prediction (i.e., a prediction direction is closer to horizontal intra prediction direction other than the vertical prediction direction), only the first (height/($2^{5-k}$)) (or min(width, height)/($2^{5-k}$)) rows of current block will be processed by the PDPC process.

Figure 10:
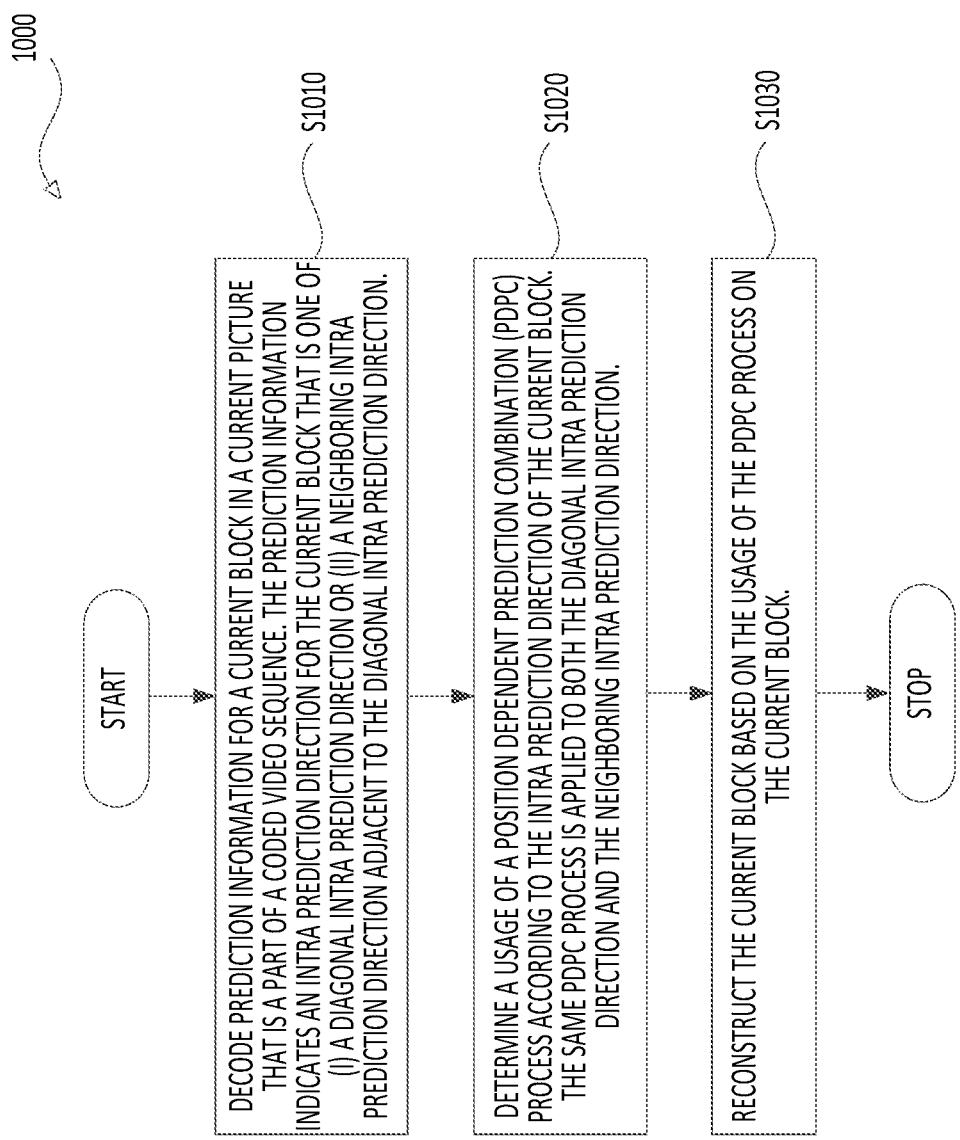
FIG. 10 shows a flow chart outlining an exemplary process according to an embodiment of the disclosure.

FIG. 10 shows a flow chart outlining an exemplary process (1000) according to an embodiment of the disclosure. In various embodiments, the process (1000) is executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the intra prediction module (452), the processing circuitry that performs functions of the video encoder (503), the processing circuitry that performs functions of the predictor (535), the processing circuitry that performs functions of the intra encoder (622), the processing circuitry that performs functions of the intra decoder (772), and the like. In some embodiments, the process (1000) is implemented in software instructions, thus when the processing circuitry executes the software instructions, the processing circuitry performs the process (1000).

The process (1000) may generally start at step (S1010), where the process (1000) decodes prediction information for a current block in a current picture that is a part of a coded video sequence. The prediction information indicates an intra prediction direction for the current block that is one of (i) a diagonal intra prediction direction or (ii) a neighboring intra prediction direction adjacent to the diagonal intra prediction direction. Then the process (1000) proceeds to step (S1020).

At step (S1020), the process (1000) determines a usage of a position dependent prediction combination (PDPC) process according to the intra prediction direction of the current block. The same PDPC process is applied to both the diagonal intra prediction direction and the neighboring intra prediction direction. Then the process (1000) proceeds to step (S1030).

At step (S1030), the process (1000) reconstructs the current block based on the usage of the PDPC process on the current block.

After reconstructing the current block, the process (1000) terminates.

In some embodiments, the diagonal intra prediction direction is one of a bottom-left intra prediction direction and a top-right intra prediction direction. In an embodiment, when the diagonal intra prediction direction is the bottom-left intra prediction direction, a mode index of the neighboring intra prediction direction is below a mode index of a horizontal intra prediction direction. In an embodiment, when the diagonal intra prediction direction is the top-right intra prediction direction, the mode index of the neighboring intra prediction direction is above a mode index of a vertical intra prediction direction.

In an embodiment, when the intra prediction direction is the neighboring intra prediction direction, the process (1000) determines whether the intra prediction direction points to a fractional position. In response to a determination that the intra prediction points to the fractional position, the process (1000) determines an early termination of the PDPC process.

In some embodiments, when a current sample in the current block is to be filtered by the PDPC process, the process (1000) determines whether a reference sample of the current sample is located within a preset range according to a per-row or per-column checking. In an embodiment, the per-column checking depends on at least one of (i) a total number of available reference samples that are located left to the current block, (ii) a block height of the current block, and (iii) a horizontal coordinate value of the current sample. In an embodiment, the per-row checking depends on at least one of (i) a total number of available reference samples that are located above the current block, (ii) a block width of the current block, (iii) and a vertical coordinate value of the current sample.

In some embodiments, an angle of the intra prediction direction is equal to or greater than a preset value. In an embodiment, when the intra prediction direction is closer to the vertical intra prediction direction than the horizontal intra prediction direction, the process (1000) performs the PDPC process on a first number of columns of samples in the current block, and the first number is determined according to the preset value and a block size of the current block. In an embodiment, when the intra prediction direction is closer to the horizontal intra prediction direction than the vertical intra prediction direction, the process (1000) performs the PDPC process on a second number of rows of samples in the current block, and the second number is determined according to the preset value and the block size of the current block.

The techniques described above, can be implemented as computer software using computer-readable instructions and physically stored in one or more computer-readable media. For example, FIG. 11 shows a computer system (1100) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 11:
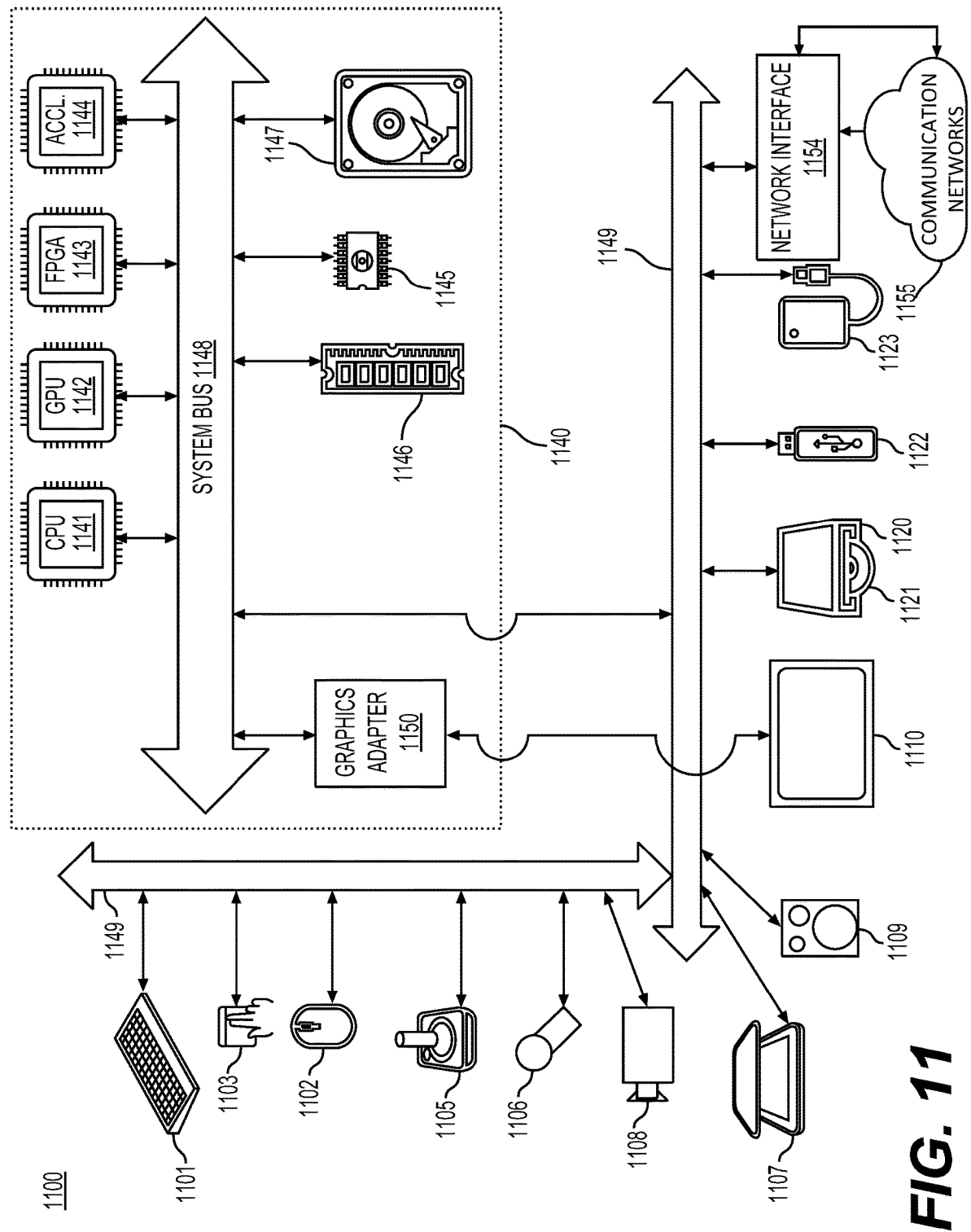
FIG. 11 is a schematic illustration of a computer system in accordance with an embodiment.

The components shown in FIG. 11 for computer system (1100) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1100).

Computer system (1100) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1101), mouse (1102), trackpad (1103), touch screen (1110), data-glove (not shown), joystick (1105), microphone (1106), scanner (1107), camera (1108).

Computer system (1100) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1110), data-glove (not shown), or joystick (1105), but there can also be tactile feedback devices that do not serve as input devices), audio output devices (such as: speakers (1109), headphones (not depicted)), visual output devices (such as screens (1110) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). These visual output devices (such as screens (1110)) can be connected to a system bus (1148) through a graphics adapter (1150).

Computer system (1100) can also include human accessible storage devices and their associated media such as optical media including CD/DVD ROM/RW (1120) with CD/DVD or the like media (1121), thumb-drive (1122), removable hard drive or solid state drive (1123), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1100) can also include a network interface (1154) to one or more communication networks (1155). The one or more communication networks (1155) can for example be wireless, wireline, optical. The one or more communication networks (1155) can further be local, wide-area, metropolitan, vehicular and industrial, real-time, delay-tolerant, and so on. Examples of the one or more communication networks (1155) include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1149) (such as, for example USB ports of the computer system (1100)); others are commonly integrated into the core of the computer system (1100) by attachment to a system bus as described below (for example Ethernet interface into a PC computer system or cellular network interface into a smartphone computer system). Using any of these networks, computer system (1100) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1140) of the computer system (1100).

The core (1140) can include one or more Central Processing Units (CPU) (1141), Graphics Processing Units (GPU) (1142), specialized programmable processing units in the form of Field Programmable Gate Areas (FPGA) (1143), hardware accelerators for certain tasks (1144), and so forth. These devices, along with Read-only memory (ROM) (1145), Random-access memory (1146), internal mass storage such as internal non-user accessible hard drives, SSDs, and the like (1147), may be connected through the system bus (1148). In some computer systems, the system bus (1148) can be accessible in the form of one or more physical plugs to enable extensions by additional CPUs, GPU, and the like. The peripheral devices can be attached either directly to the core's system bus (1148), or through a peripheral bus (1149). Architectures for a peripheral bus include PCI, USB, and the like.

CPUs (1141), GPUs (1142), FPGAs (1143), and accelerators (1144) can execute certain instructions that, in combination, can make up the aforementioned computer code. That computer code can be stored in ROM (1145) or RAM (1146). Transitional data can be also be stored in RAM (1146), whereas permanent data can be stored for example, in the internal mass storage (1147). Fast storage and retrieve to any of the memory devices can be enabled through the use of cache memory, that can be closely associated with one or more CPU (1141), GPU (1142), mass storage (1147), ROM (1145), RAM (1146), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1100), and specifically the core (1140) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1140) that are of non-transitory nature, such as core-internal mass storage (1147) or ROM (1145). The software implementing various embodiments of the present disclosure can be stored in such devices and executed by core (1140). A computer-readable medium can include one or more memory devices or chips, according to particular needs. The software can cause the core (1140) and specifically the processors therein (including CPU, GPU, FPGA, and the like) to execute particular processes or particular parts of particular processes described herein, including defining data structures stored in RAM (1146) and modifying such data structures according to the processes defined by the software. In addition or as an alternative, the computer system can provide functionality as a result of logic hardwired or otherwise embodied in a circuit (for example: accelerator (1144)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

APPENDIX A: ACRONYMS

AMVP: Advanced Motion Vector Prediction
ASIC: Application-Specific Integrated Circuit
ATMVP: Alternative/Advanced Temporal Motion Vector Prediction
BDOF: Bi-directional Optical Flow
BIO: Bi-directional Optical Flow
BMS: Benchmark Set
BV: Block Vector
CANBus: Controller Area Network Bus
CB: Coding Block
CBF: Coded Block Flag
CCLM: Cross-Component Linear Mode/Model
CD: Compact Disc
CPR: Current Picture Referencing
CPUs: Central Processing Units
CRT: Cathode Ray Tube
CTBs: Coding Tree Blocks
CTUs: Coding Tree Units
CU: Coding Unit
DPB: Decoder Picture Buffer
DVD: Digital Video Disc
FPGA: Field Programmable Gate Areas
GOPs: Groups of Pictures
GPUs: Graphics Processing Units
GSM: Global System for Mobile communications
HDR: High Dynamic Range
HEVC: High Efficiency Video Coding
HRD: Hypothetical Reference Decoder
IBC: Intra Block Copy
IC: Integrated Circuit
ISP: Intra Sub-Partitions
JEM: Joint Exploration Model
JVET: Joint Video Exploration Team
LAN: Local Area Network
LCD: Liquid-Crystal Display
LTE: Long-Term Evolution
MPM: Most Probable Mode
MTS: Multiple Transform Selection
MV: Motion Vector
OLED: Organic Light-Emitting Diode
PBs: Prediction Blocks
PCI: Peripheral Component Interconnect
PDPC: Position Dependent Prediction Combination
PLD: Programmable Logic Device
PU: Prediction Unit
RAM: Random Access Memory
ROM: Read-Only Memory
SBT: Sub-block Transform
SCC: Screen Content Coding
SDR: Standard Dynamic Range
SEI: Supplementary Enhancement Information
SNR: Signal Noise Ratio
SSD: Solid-state Drive
TUs: Transform Units
USB: Universal Serial Bus
VPDU: Visual Process Data Unit
VUI: Video Usability Information
VVC: Versatile Video Coding
WAIP: Wide-Angle Intra Prediction

What is claimed is:

1. A method for video decoding in a decoder, comprising:
decoding prediction information for a current block in a current picture that is a part of a coded video sequence, the prediction information indicating an intra prediction direction for the current block that is one of (i) a diagonal intra prediction direction or (ii) a neighboring intra prediction direction adjacent to the diagonal intra prediction direction;
determining a usage of a position dependent prediction combination (PDPC) process according to the intra prediction direction of the current block, the same PDPC process being applied to both the diagonal intra prediction direction and the neighboring intra prediction direction; and
reconstructing, by circuitry, the current block based on the usage of the PDPC process on the current block, wherein
when the intra prediction direction is closer to a vertical intra prediction direction than a horizontal intra prediction direction, the PDPC process is performed on a first number of columns of samples in the current block, and
when the intra prediction direction is closer to the horizontal intra prediction direction than the vertical intra prediction direction, the PDPC process is performed on a second number of rows of samples in the current block.

2. The method of claim 1, wherein the diagonal intra prediction direction is one of a bottom-left intra prediction direction and a top-right intra prediction direction.

3. The method of claim 2, wherein when the diagonal intra prediction direction is the bottom-left intra prediction direction, a mode index of the neighboring intra prediction direction is below a mode index of a horizontal intra prediction direction.

4. The method of claim 2, wherein when the diagonal intra prediction direction is the top-right intra prediction direction, a mode index of the neighboring intra prediction direction is above a mode index of a vertical intra prediction direction.

5. The method of claim 1, further comprising:
when the intra prediction direction is the neighboring intra prediction direction,
determining whether the intra prediction direction points to a fractional position; and
determining an early termination of the PDPC process when the intra prediction direction points to the fractional position.

6. The method of claim 1, further comprising:
when a current sample in the current block is to be filtered by the PDPC process,
determining whether a reference sample of the current sample is located within a preset range according to a per-row or per-column checking.

7. The method of claim 6, wherein the per-column checking depends on at least one of (i) a total number of available reference samples that are located left to the current block, (ii) a block height of the current block, and (iii) a horizontal coordinate value of the current sample.

8. The method of claim 6, wherein the per-row checking depends on at least one of (i) a total number of available reference samples that are located above the current block, (ii) a block width of the current block, (iii) and a vertical coordinate value of the current sample.

9. The method of claim 1, wherein an angle of the intra prediction direction is equal to or greater than a preset value.

10. The method of claim 9, wherein
the first number is determined according to the preset value and a block size of the current block; and
the second number is determined according to the preset value and the block size of the current block.

11. A method for video encoding in an encoder, comprising:
determining a usage of a position dependent prediction combination (PDPC) process according to an intra prediction direction of a current block that is one of (i) a diagonal intra prediction direction or (ii) a neighboring intra prediction direction adjacent to the diagonal intra prediction direction, the same PDPC process being applied to both the diagonal intra prediction direction and the neighboring intra prediction direction; and
encoding, by circuitry, the current block based on the usage of the PDPC process on the current block, wherein
when the intra prediction direction is closer to a vertical intra prediction direction than a horizontal intra prediction direction, the PDPC process is performed on a first number of columns of samples in the current block, and
when the intra prediction direction is closer to the horizontal intra prediction direction than the vertical intra prediction direction, the PDPC process is performed on a second number of rows of samples in the current block.

12. The method of claim 11, wherein the diagonal intra prediction direction is one of a bottom-left intra prediction direction and a top-right intra prediction direction.

13. The method of claim 12, wherein when the diagonal intra prediction direction is the bottom-left intra prediction direction, a mode index of the neighboring intra prediction direction is below a mode index of a horizontal intra prediction direction.

14. The method of claim 12, wherein when the diagonal intra prediction direction is the top-right intra prediction direction, a mode index of the neighboring intra prediction direction is above a mode index of a vertical intra prediction direction.

15. The method of claim 11, further comprising:
when the intra prediction direction is the neighboring intra prediction direction,
determining whether the intra prediction direction points to a fractional position; and
determining an early termination of the PDPC process when the intra prediction direction points to the fractional position.

16. The method of claim 11, further comprising:
when a current sample in the current block is to be filtered by the PDPC process,
determining whether a reference sample of the current sample is located within a preset range according to a per-row or per-column checking.

17. The method of claim 16, wherein the per-column checking depends on at least one of (i) a total number of available reference samples that are located left to the current block, (ii) a block height of the current block, and (iii) a horizontal coordinate value of the current sample.

18. The method of claim 16, wherein the per-row checking depends on at least one of (i) a total number of available reference samples that are located above the current block, (ii) a block width of the current block, (iii) and a vertical coordinate value of the current sample.

19. The method of claim 11, wherein an angle of the intra prediction direction is equal to or greater than a preset value.

20. A method of processing visual media data, the method comprising:
processing a bitstream that includes the visual media data according to a format rule, wherein
the bitstream includes prediction information for a current block in a current picture, the prediction information indicating an intra prediction direction for the current block that is one of (i) a diagonal intra prediction direction or (ii) a neighboring intra prediction direction adjacent to the diagonal intra prediction direction; and
the format rule specifies that
a usage of a position dependent prediction combination (PDPC) process is based on the intra prediction direction of the current block, the same PDPC process being applied to both the diagonal intra prediction direction and the neighboring intra prediction direction,
the current block is processed based on the usage of the PDPC process on the current block,
when the intra prediction direction is closer to a vertical intra prediction direction than a horizontal intra prediction direction, the PDPC process is performed on a first number of columns of samples in the current block, and
when the intra prediction direction is closer to the horizontal intra prediction direction than the vertical intra prediction direction, the PDPC process is performed on a second number of rows of samples in the current block.

* * * * *